(12) United States Patent
Richards et al.

(10) Patent No.: US 7,702,654 B2
(45) Date of Patent: Apr. 20, 2010

(54) ASSET MANAGEMENT IN MEDIA PRODUCTION

(75) Inventors: Sam Richards, Los Angeles, CA (US); Reid Hartenbower, Los Angeles, CA (US); Rob Bredow, Los Angeles, CA (US); Chris Juen, Los Angeles, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 646 days.

(21) Appl. No.: 11/104,217

(22) Filed: Apr. 11, 2005

(65) Prior Publication Data

US 2005/0228819 A1    Oct. 13, 2005

Related U.S. Application Data

(60) Provisional application No. 60/560,998, filed on Apr. 9, 2004.

(51) Int. Cl.
G06F 7/00 (2006.01)
G06F 17/00 (2006.01)
G06Q 10/00 (2006.01)
G06Q 30/00 (2006.01)

(52) U.S. Cl. ...................... 707/104.1; 705/1
(58) Field of Classification Search ............. 707/104.1; 705/1
See application file for complete search history.

(56) References Cited

U.S. PATENT DOCUMENTS

| 6,038,588 | A | * | 3/2000 | Nagarajayya et al. | ........ 718/102 |
| 6,181,336 | B1 | * | 1/2001 | Chiu et al. | ................. 715/736 |
| 6,922,687 | B2 | * | 7/2005 | Vernon | .......................... 707/1 |
| 7,035,809 | B2 | * | 4/2006 | Miller et al. | ................... 705/8 |
| 7,143,357 | B1 | * | 11/2006 | Snibbe et al. | ............... 715/751 |
| 2002/0093538 | A1 | * | 7/2002 | Carlin | ....................... 345/778 |
| 2003/0139986 | A1 | * | 7/2003 | Roberts, Jr. | ................. 705/30 |
| 2004/0034662 | A1 | * | 2/2004 | Austin et al. | ............. 707/104.1 |

OTHER PUBLICATIONS

Lamorlette et al. "Structural Modeling of Flames for a Production Environment." © 2002 ACM. pp. 729-734.*
Igarashi et al. "Adaptive Unwrapping for Interactive Texture Painting." © ACM 2001.*

* cited by examiner

*Primary Examiner*—Apu M Mofiz
*Assistant Examiner*—Charles E Lu
(74) *Attorney, Agent, or Firm*—Samuel S. Lee; Procopio, Cory, Hargreaves & Savitch LLP

(57) ABSTRACT

An asset management system for managing media assets in media production. The system includes a database and a database interface. The database stores a plurality of records, each record storing information for a media asset. Each record includes work performance information for the media asset. The database interface is coupled to the database and to a network. The database interface is configured to provide access to the plurality of records, and to collect and manage information for the corresponding media assets.

21 Claims, 40 Drawing Sheets

| Num | Element | Task | Notes | Assigned To | Status | Estimated Start Date | Estimated End Date | Estimated Total Days | Actual Start Date | Actual End Date |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | | | | | | | | | |
| 6 | seq/ba/ba01 | Lighting | Finaled on Monday | clara | Final | 09/03/03 | 10/05/03 | 14.00 | 09/03/03 | 10/17/03 |
| 7 | seq/ba/ba02 | Lighting | | clara | Final | 10/26/03 | 12/05/03 | 9.00 | 08/20/03 | 12/17/03 |
| 8 | seq/ba/ba04 | Lighting | Received final matte painting | oc | Final | 10/11/03 | 10/30/03 | 2.00 | 08/27/03 | 10/25/03 |
| 9 | seq/ba/ba20 | Lighting | | jv | Final | 11/19/03 | 11/27/03 | 5.00 | 11/14/03 | 12/03/03 |
| 10 | seq/hb/hb45 | Lighting | | dw | Final | 02/27/04 | 03/08/04 | 5.00 | 03/04/04 | 03/10/04 |
| 11 | seq/ta/ta39 | Lighting | 21067 is the previously approved | oc | Final | 11/08/03 | 01/08/04 | 9.00 | 08/19/03 | 01/07/04 |

FIG. 32

| Num | Actual Total Days | Actual Comp % | 2 | 4 | 6 | 8 | 10 | Consumed % | Condition | Variance | Date Start | Grant Chart |
|---|---|---|---|---|---|---|---|---|---|---|---|---|
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | 18.86 | 100 | | 0 | 0 | 0 | 0 | 135% | Red | 4.86 | | |
| 7 | 29.95 | 100 | | 0 | 0 | 0 | 0 | 333% | Red | 20.95 | | |
| 8 | 11.71 | 100 | | | | | | 586% | Red | 9.71 | | |
| 9 | 13.85 | 100 | | | | | | 277% | Red | 8.85 | | |
| 10 | 10.3 | 100 | | | | | | 206% | Red | 5.3 | | |
| 11 | 21.4 | 100 | | | | | | 238% | Red | 12.4 | | |

FIG. 33

Sequence Status Report

| Sequence | Task | # Shots On Hold | # Shots Not Started | # Shots In Inventory | # Shots I/P | # Shots Done | Total # Shots | % Shots Done | # frames | Feet | Seq Total Feet | Footage % Done |
|---|---|---|---|---|---|---|---|---|---|---|---|---|
| ba | Animation | | | | | 20 | 20 | 100 | 4800 | 300 | 300 | 100 |
| ba | Animation Support | | | | | | | | | | | |
| ba | Cloth | | | | | | | | | | | |
| ba | FX Animation | | | | | | | | | | | |
| ba | Final Layout | | | | | | | | | | | |
| ba | Integration | | | | | | | | | | | |
| ba | Layout | | | | | | | | | | | |
| ba | Lighting | | | | | | | | | | | |
| ba | Matte Painting | | | | | | | | | | | |
| bk | Animation | 1 | 2 | 2 | 2 | 3 | 10 | 30 | 900 | 50 | 200 | 25 |
| bk | Animation Support | | | | | | | | | | | |
| bk | Final Layout | | | | | | | | | | | |
| bk | Integration | | | | | | | | | | | |
| bk | Layout | | | | | | | | | | | |
| bk | Lighting | | | | | | | | | | | |
| bk | Matte Painting | | | | | | | | | | | |
| bs | Animation | | 47 | | | 3 | 50 | 6 | 200 | 10 | 100 | 10 |
| bs | Animation Support | | | | | | | | | | | |
| bs | Cloth | | | | | | | | | | | |
| bs | FX Animation | | | | | | | | | | | |
| bs | Final Layout | | | | | | | | | | | |
| bs | Hair | | | | | | | | | | | |
| bs | Integration | | | | | | | | | | | |
| bs | Layout | | | | | | | | | | | |
| bs | Lighting | | | | | | | | | | | |
| bs | Matte Painting | | | | | | | | | | | |
| bt | Animation | | | | | | | | | | | |
| bt | Animation Support | | | | | | | | | | | |
| bt | Cloth | | | | | | | | | | | |
| bt | FX Animation | | | | | | | | | | | |

FIG. 34

| Sequence | Task | Char Feet | Bid Total Days | Actual Total Days | % Days Used | Days left to do |
|---|---|---|---|---|---|---|
| ba | Animation | 260 | 50 | 10 | 20 | |
| ba | Animation Support | | | | | |
| ba | Cloth | | | | | |
| ba | FX Animation | | | | | |
| ba | Final Layout | | | | | |
| ba | Integration | | | | | |
| ba | Layout | | | | | |
| ba | Lighting | | | | | |
| ba | Matte Painting | | | | | |
| bk | Animation | 75 | 80 | 20 | 25 | 40 |
| bk | Animation Support | | | | | |
| bk | Final Layout | | | | | |
| bk | Integration | | | | | |
| bk | Layout | | | | | |
| bk | Lighting | | | | | |
| bk | Matte Painting | | | | | |
| bs | Animation | 40 | 5 | 6 | 120 | 0 |
| bs | Animation Support | | | | | |
| bs | Cloth | | | | | |
| bs | FX Animation | | | | | |
| bs | Final Layout | | | | | |
| bs | Hair | | | | | |
| bs | Integration | | | | | |
| bs | Layout | | | | | |
| bs | Lighting | | | | | |
| bs | Matte Painting | | | | | |
| bt | Animation | | | | | |
| bt | Animation Support | | | | | |
| bt | Cloth | | | | | |
| bt | FX Animation | | | | | |

FIG. 35

2-week Lookahead Report

| Sup | Layout | Integration | Animation | Final Layout | Hair | Cloth | Matte Painting | FX Animation | Lighting |
|---|---|---|---|---|---|---|---|---|---|
| Seanp | | sa46 I/P<br>sa55 On Hold<br>(SS: On Hold) | sa 82 I/P | sa56 I/P | | pm21a Final | lb54 Temp<br>lb58a Temp | pm18 Final | pm10 I/P<br>pm12 Not Started |
| | em06 Final<br>em09 Final | em07 I/P | sa83 I/P<br>cb09b I/P | sa68 Final<br>cb10 Final | em11 I/P | sa07 I/P<br>cb21 Final<br>tc19a Final | | cg24 I/P<br>pm32a Final | lt07 Done<br>pm32a Done |
| markl | em18 I/P | tc02 Done | cb27 I/P | em11 Final | | | | | |
| | | wb03 I/P | cb40 Done | em15 Final | | tc26 Final | | | |
| | cm06 I/P (SS: Turned Over) | cm11 Done | cm08a Blocked KD | bs08 I/P | | bs08 I/P<br>bs39 Temp | bs04 I/P | hb103 Final | hb103 Done<br>hb107 Done |
| rob | np05 Final | hb118 On Hold | hb24 I/P | hb118 I/P | | | hb101 I/P | hb 107 Final | |
| | | | | ha14 Final<br>ha25 Final | | hc01 I/P<br>hc02 I/P | bk01 I/P (SS: On Hold) | | ha03 Blocked KD<br>hc01 I/P |
| menache | ha23 Final | ha23 Done | hc31 I/P | hc11a I/P | ls12 I/P | hc18 I/P | ls12 I/P | | hc24b I/P |
| Shot Totals | 6/10 | 8/21 | 4/25 | 12/22 | 2/8 | 11/24 | 3/3 | 12/16 | 8/29 |
| Footage Totals | 32/131 | 86/401 | 45/307 | 201/280 | 8/103 | 61/275 | 14/446 | 118/168 | 67/276 |
| Total Frames | 503/2069 | 1354/6387 | 711/4885 | 4000/4449 | 113/1612 | 966/4375 | 215/7105 | 1868/2664 | 1050/4384 |
| Total Seconds | 22/88 | 57/268 | 31/205 | 134/187 | 6/3 | 41/182 | 10/298 | 79/113 | 45/185 |

FIG. 36

| Sup | Layout | Integration | Animation | Final Layout | Hair | Cloth | Matte Painting | FX Animation | Lighting |
|---|---|---|---|---|---|---|---|---|---|
| seanp | | sa57 I/P<br>sa67 On Hold<br>(SS: On Hold) | lb58a<br>Inventory KD<br>sa01 I/P | | bt32 I/P<br>lb58b I/P | bt32 Temp | pm23 I/P | | lb01<br>Blocked<br>KD<br>lb06 I/P |
| | | em02 I/P<br>em03 I/P | cb06 Inventory<br>KD<br>cb25a Blocked<br>KD | | | cb10<br>Temp<br>cg30<br>Temp<br>em15<br>Temp | | | cb15 I/P<br>cg31 I/P<br>em13<br>Blocked<br>KD |
| | | em14 On Hold<br>KD<br>em17 On Hold<br>KD | cb35 I/P<br>cb37 Blocked<br>KD | | | tc03 I/P | | | |
| markl | | | | | cb09a I/P | | | | |
| | | | hb31a I/P | | | ht71<br>Temp | pm13 I/P | | hb97 I/P<br>ta02 I/P |
| rob | | | | | ta02 I/P | ha14<br>Temp | | | ha05 I/P<br>hc19a I/P<br>pm15 I/P |
| menache | | | | | | | | | |
| Shot Totals | | | | | | | | | |
| Footage Totals | | | | | | | | | |
| Total Frames | | | | | | | | | |
| Total Seconds | | | | | | | | | |

FIG. 37

Weekly Team status report summary

| Name | Asset | Task | 3/22/2004 | 3/23/2004 | 3/24/2004 | 3/25/2004 | 3/26/2004 | 3/27/2004 | 3/28/2004 | Task Total |
|---|---|---|---|---|---|---|---|---|---|---|
| | /seq/cm | Lighting Supervision | 6 | 6 | 6 | 6 | 6 | | | 30 |
| | /seq/cm/keylighting/cm04 | Lighting | | 3 | | | | | | 3 |
| | /seq/hb/hb25 | Lighting | | 2 | 4 | 4 | 3 | | | 13 |
| | /seq/pm/pm22 | Lighting | 6 | | | | | | | 6 |
| | Total | | 12 | 11 | 10 | 10 | 9 | | | 52 |
| adrian | Timecard Total | | 12 | 11 | 10 | 10 | 10 | | | 53 |
| | /seq/hb/hb101 | Lighting | | | 2 | | | | | 2 |
| | /seq/hb/hb106 | Lighting | | | | 2 | | | | 2 |
| | /seq/hb/hb108 | Lighting | 11 | 3 | 2 | 2 | | | | 18 |
| | /seq/hb/hb114 | Lighting | | | 3 | | | | | 3 |
| | /seq/hb/hb16 | Lighting | | | 2.5 | | 2 | | | 4.5 |
| | /seq/pm/pm18 | Lighting | | 5 | 2 | 2 | 1 | | | 10 |
| | /seq/ta/ta04 | Lighting | | | | 8 | 3 | | | |
| | Total | | 11 | 8 | 11.5 | 8 | 3 | | | 41.5 |
| todd | Timecard Total | | 11 | 8 | 11.5 | 8 | 3 | | | 41.5 |

FIG. 38

ASSET MANAGEMENT IN MEDIA PRODUCTION

CROSS-REFERENCE TO RELATED APPLICATIONS

This application claims the benefit of priority of co-pending U.S. Provisional Patent Application Ser. No. 60/560,998 entitled "Asset Management in Media Production", filed Apr. 9, 2004. Benefit of priority of the filing date of Apr. 9, 2004 is hereby claimed, and the disclosure of the Provisional Patent Application is hereby incorporated by reference.

BACKGROUND

Producing a modern motion picture can involve the production and management of a large number of media assets. For example, sequences of shots in a movie can be stored as digital information before transfer to film. In turn some or all of the shots can use assets, such as audio and video sequences, images, computer graphics information (e.g., characters, props, environments, models), and other related assets. Many assets require work and development from different people and groups, sometimes passing back and forth as adjustments are made. Managing the various assets through their stages of development can become very complicated. Accordingly, it is highly desirable for information of assets for media production (i.e., asset information) to be stored in one or more databases and to provide a convenient interface to access that information for production.

SUMMARY

The present invention provides methods, systems, and computer programs for managing media assets in media production.

In one implementation, a management system includes an asset database storing information for assets used to produce a movie. The asset database has a corresponding interface providing access to the asset information to support tracking, scheduling, managing, and adjusting the assets. The management system provides tools to allow a user to determine quickly the answers to questions such as: what is holding up a shot, what assets are needed for a shot or shots, or which assets need to be completed first.

In another implementation, a management system comprises: a database storing a plurality of records, each record storing information for a media asset, and each record including work performance information for the media asset; and a database interface coupled to the database and to a network, the database interface configured to provide access to the plurality of records, and to collect and manage information for the corresponding media assets.

In different implementations, various types of assets can be managed for different types of production, such as for music, television, or video game production.

BRIEF DESCRIPTION OF THE DRAWINGS

FIG. 10 illustrates one example of an asset tasks screen allowing a user to define task statuses.

FIG. 15 and FIG. 16 illustrate examples of a status report and a summary report for a department of a media production company.

FIG. 20 illustrates an environment sub-directories screen for an asset K.

FIG. 32 and FIG. 33 illustrate one example of a screen shot of the scheduling interface tool Schedulomatic.

FIG. 34 through FIG. 38 show more examples of screen shots of shot sequence status reports and look ahead reports.

DESCRIPTION

The present invention provides methods, systems, and apparatus for managing assets for media production. The asset management involves, among other tasks, tracking, managing workflow, adjusting, and scheduling of the assets, as well as generating reports covering both the ongoing status of elements and statistical analyses of various production aspects. The asset information is stored in one or more databases. Depending upon the type of assets and type of production, different information can be stored. For example, to assess work performance for assets, work performance information for the assets is stored, such as completion, pipeline, and status information. Examples of asset types include character, cloth, component, environment, model, sequence, show, and task.

Users of the system generate, access, and update the asset information through one or more interfaces to facilitate the media production. The interfaces provide user customizable and dynamic access to the stored asset information.

The progress of an asset can be reported in detail by week, artist, sequence, character, component, or summarized for an entire department. Other reports are used to identify problem spots and bottlenecks in the production workflows. Specific tasks can also be tracked by artist or status. From an asset's perspective, a workflow is a sequence of task sets applied to the asset by human or computer agents, where each successive set of tasks happens only after the preceding set is complete, and any given set of tasks is assumed to occur simultaneously.

Figure 1:
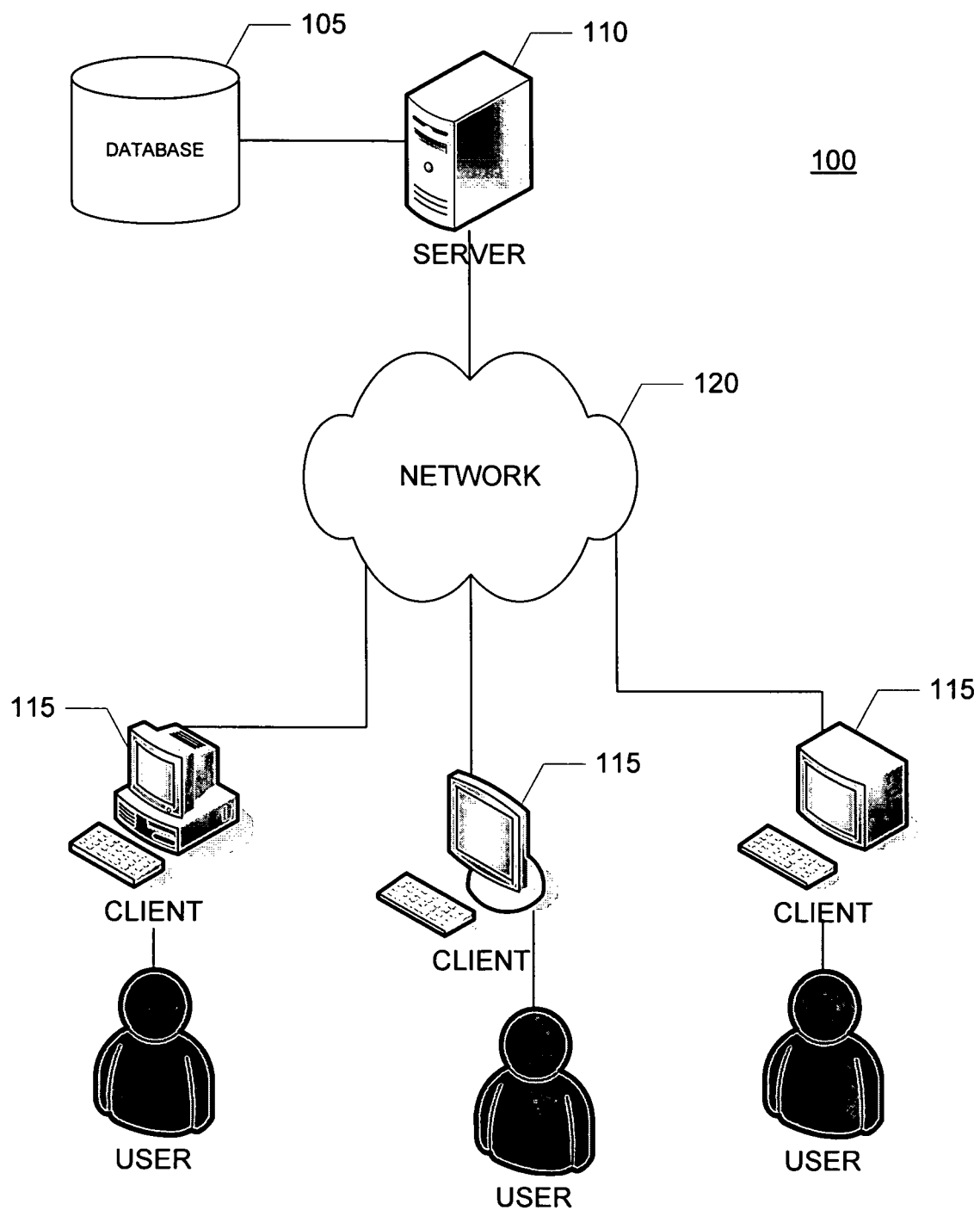
FIG. 1 shows a block diagram of one implementation of an asset management system.

FIG. 1 shows a block diagram of one implementation of an asset management system 100. A database 105 (e.g., an Oracle database) stores asset information for assets. Alternatively, the database 105 represents a collection of databases. The data for the assets is stored elsewhere (not shown). Alternatively, the database 105 also stores assets. In one implementation, the database 105 provides access to the assets as well, such as through queries to a related asset database (not shown). A server 110 connected to the database 105 provides an interface to access the database 105. One or more client systems 115 can connect to the server 110 through a network 120, such as the Intranet or Ethernet.

In one example, a collection of databases is used to store asset information for the assets used in the production of a movie. Using a combination of static information, dynamic and real-time information, and dependencies among assets, a group of users of the asset management system 100 can determine and update information about the status of the movie production. From the asset creator level (e.g., computer graphics artists) to the production supervision level, users of the system 100 can advantageously access the data collected for the assets of the media production and enhance productivity.

An asset is a collection of data, such as an object or file. Thus, an asset is similar in concept to a term referred to as 'artifact' in the Unified Modeling Language (UML). Within the UML, an artifact is a classifier that represents a physical piece of information, such as a model, a file, or a table, used or produced by a software development process.

An asset can have corresponding or related assets, or include other embedded assets. In media production, examples of assets include, but are not limited to, sequences of shots in a movie, shots in a movie, environments, models, textures, lighting, characters, rigs, frames, props, sounds, and music. There are also procedural assets (e.g., programs) like shaders, which operate on other assets. Assets can also be items that are not stored themselves, but for which asset information is to be stored, such as a person or location, or film shots that are not stored. An example of asset information for a film shot asset includes a summary of what is being held up by lack of progress on the film shot. The asset information can be stored separately from the assets.

Figure 2:
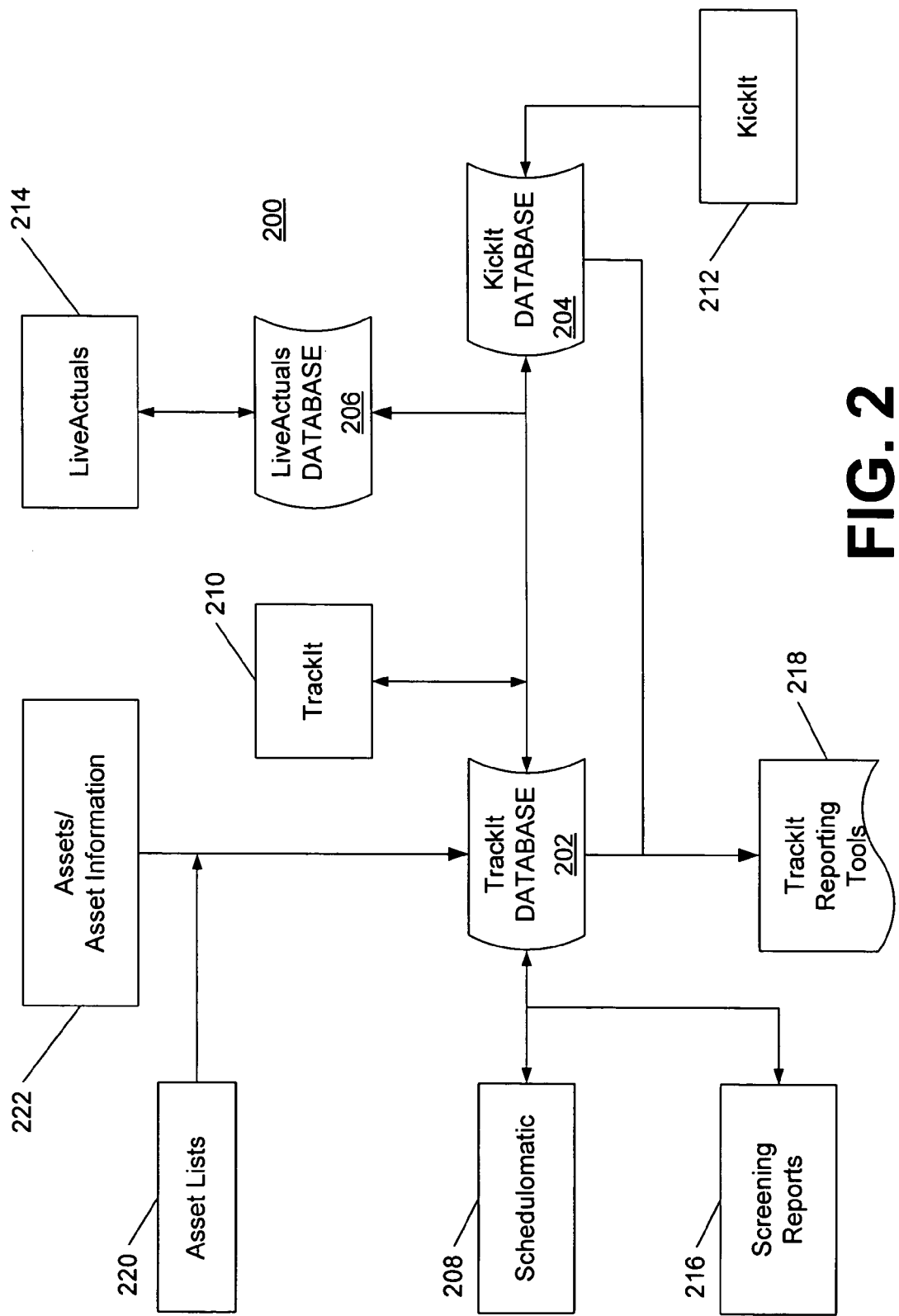
FIG. 2 shows a representation of one implementation of interaction in an asset management system, such as involving the database and server shown in FIG. 1.

FIG. 2 shows a representation of one implementation of interaction in an asset management system 200, such as involving the database 105 and server 110 shown in FIG. 1. In the illustrated asset management system 200, three databases are shown: a TrackIt database 202, a KickIt database 204, and a LiveActuals database 206. In an alternative implementation, two or more of these databases 202, 204, and/or 206 can be combined together. Users of the system 200 can access the asset information in the databases 202, 204, 206 through various interfaces (which may be implemented as separate or integrated tools), such as TrackIt 210, the TrackIt reporting tools 218, KickIt 212, LiveActuals 214, user asset lists 220, Schedulomatic 208, Screening Reports 216, and other report generators.

TrackIt 210 provides tracking and managing of assets and/or asset information 222 entered into the TrackIt database 202, updated on a real-time basis on the LiveActuals database 206, and revised on the KickIt database 204. TrackIt 210 tracks actual time spent on tasks, tracks asset progress, allows forecasting tasks, provides real-time reports, and allows searching of the databases 202, 204, 206. In one implementation, the assets and/or asset information 222 can be entered using user asset lists 220. LiveActuals 214 provides real-time information and updates on the status of assets and/or asset information using the LiveActuals database 206. Using real-time information, users can determine very accurately the current status of media production. KickIt 212 provides tracking and management of corrections to assets through supplemental asset information related to corrections.

The asset information for an asset includes the information selected for a particular media production to facilitate tracking and management of the asset. For example, in one implementation, for a shot asset, the database stores a name, a task, a status, what is being waited for, what is being held up by lack of progress on the asset, and an assigned artist. In another implementation, a single asset has multiple records, such as one record for each task in a pipeline or process used to prepare the asset so that each record reflects the start and completion dates for a task in the development of the asset. Not every asset in the same production necessarily has the same types of asset information stored.

In addition, some asset information can be derived from other asset information. For example, in one implementation, information indicating what percentage of a task has been completed for an asset is derived from stored asset information indicating an amount of time spent on the task compared to the amount of time estimated to complete the task. In another example, using amounts of time or money actually used, estimated, and/or bid for a task or asset, a performance evaluation can be made, such as for future reference.

Figure 3:
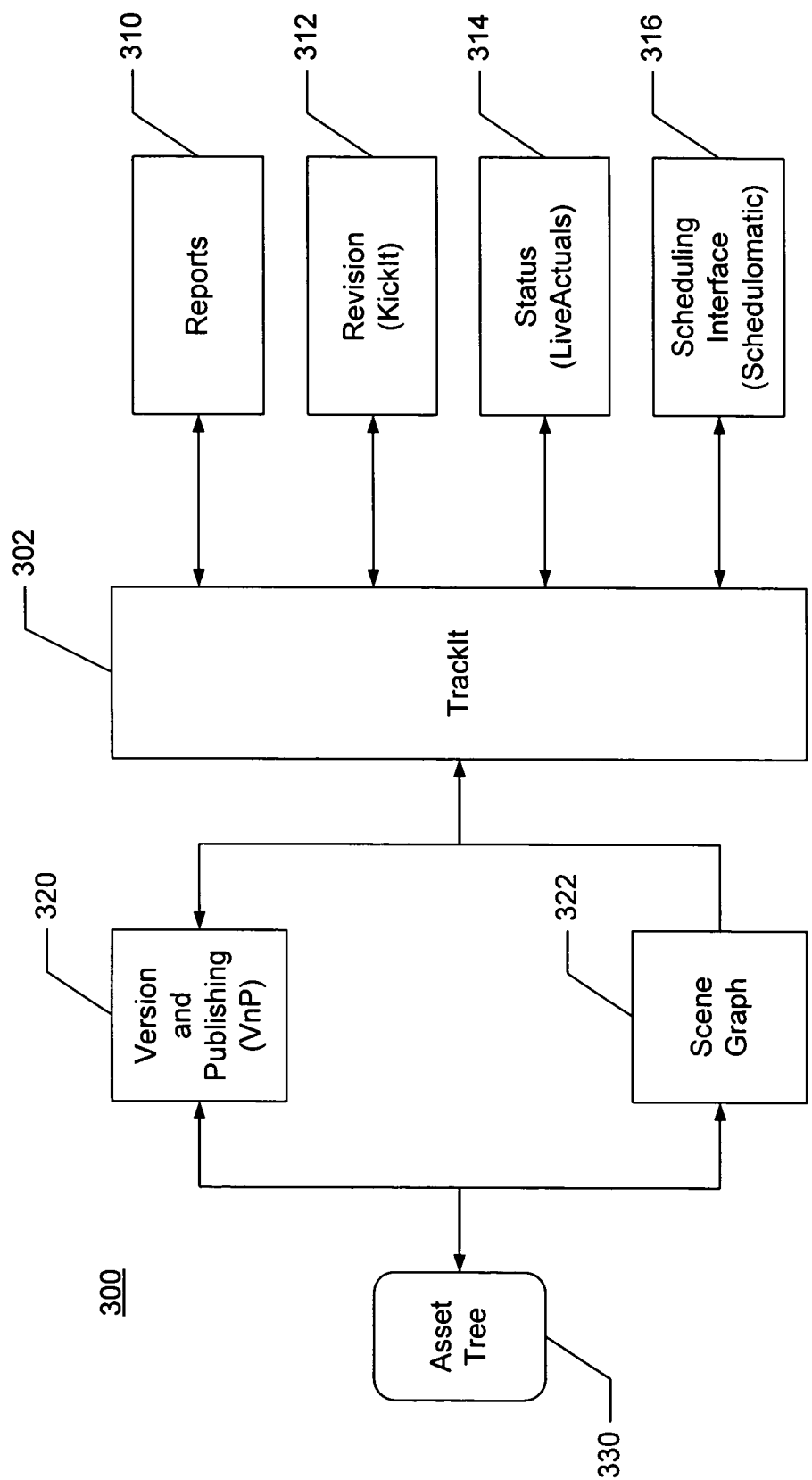
FIG. 3 shows another representation of one implementation of interaction in an asset management system.

FIG. 3 shows another representation of one implementation of interaction in an asset management system 300. The representation of FIG. 3 illustrates integration of the management tool TrackIt 302 with other production tools, which include existing tools as well as newly-developed production tools. The existing tools include a scene graph 322. The newly-developed production tools include a revision control system, referred to as Version and Publishing (VnP) 320, the reporting tool 310, the revision or defect management tool (KickIt) 312, the status tool (LiveActuals) 314, and the scheduling interface tool (Schedulomatic) 316.

LiveActuals 314 allows artists to record time spent per task. Supervisors can then determine asset progress, asset completion dates, and staff requirements, and eventually generate accurate bids on future projects.

The scheduling interface tool 316 provides a view into the asset information focused on tracking the status of tasks for assets. A user can provide a list of assets or retrieve a list of assets through a search. The scheduling interface tool 316 provides to the user asset information for the selected assets such as: current task, notes on that task, the person assigned to the asset and task, status, estimated start and end dates, estimated total work days to complete (e.g., from a bid), actual start and end days (e.g., input by artists as work progresses), actual total days worked to complete, actual completion percentage by number and graph, comparisons between estimates and actual times, and a Gantt chart. Some of the information presented can be derived (e.g., the variance between estimate and actual time). See FIGS. 10 and 22 for one implementation of the scheduling interface tool 316.

In one implementation, the data presented through the scheduling interface tool 316 is updated to reflect the most recent changes to the status and times for assets and tasks. Users can customize the interface to reflect different information or calculations according to their need. Users can also enter information through the scheduling interface to update asset information (e.g., notes or time information).

The revision interface tool 312 supports tracking the changes that are being made to an asset when a correction is needed. To correct an asset, the workflow for that asset may be appropriately "reversed" by pushing an asset from one point in the workflow back to any previous point. The previously completed tasks can be re-done from that previous point, and the sequence can continue forward.

The repetition of tasks is not necessarily linear and so the revision interface tool 312 provides a path or arc of corrections and approvals needed to correct the identified error or defect (and other implied corrections) and return the asset back to the point in production where the error was identified. Thus, an "arc" is the corrective path one or more assets (frequently only one asset, which can be a composite of assets, is involved) take through a sequence of sets of simultaneous tasks. The arc can be generated manually on demand at the time of requesting a revision or using a pre-defined set of steps or tasks (similar to a pipeline) for commonly occurring revisions.

However, some revisions may not consistently produce the same consequent revisions (e.g., depending on other factors of the asset or dependent assets), and so a manual arc is used (or a branching arc can also be used). Any arc or sequence of tasks can be altered, in terms of its composition of task sets and the asset's current position in the sequence. Depending on the type of revision needed, the asset may cause other dependent assets or tasks to become blocked (not usable until the revision is complete) or require their own adjustment to compensate. The arc defined for the corrections needed for the requested revision can form new dependencies in the new tasks.

The revision interface can also generate a record of what changes were made, the effect on time and resources (e.g., days added because of revisions), and the basis of revisions. In one implementation, revisions can be requested for technical corrections (e.g., errors or defects) or for artistic corrections (e.g., "blue would look better here"). The revision interface can help to track how many revisions were made for technical corrections (e.g., for efficiency of an artist or department) versus artistic. Various types of cost analysis can be performed using the revision information. The suite of KickIt reports can also highlight problem assets that had too many correction requests; or had correction requests that were closed and reopened frequently, generated inordinate number of comments, etc.

In another implementation, KickIt's workflow support includes an email notification system that produces notification emails to all concerned parties for any changes in the state of an asset. Such parties are identified both explicitly (by being named somewhere in the correction request) and determined by KickIt through encoded policy rules that may vary from show to show, and may resolve to either regular email addresses or pager email addresses. KickIt also customizes the composition of these emails depending on their recipients. In one implementation, the emails are in HTML and include HTML links to further possible operations on the asset(s) in question.

The status tool 314 provides real-time information and updates on the status of assets and/or asset information. Using real-time information, users can determine very accurately the current status of the media production.

The reporting tool 310 provides reports including scheduling reports such as illustrated in FIG. 32 and FIG. 33; sequence status report such as illustrated in FIG. 34 and FIG. 35; department reports, listed by a supervisor, for listing all sequences being worked on within a specific department; task status reports for providing detailed search criteria and multiple output options, and showing the development stage of each specific shot; forecast reports, such as four-week and asset look-ahead reports (see FIG. 36 and FIG. 37), for showing projected shot status; task summary reports for showing all listed tasks for a specific department; team status report summary such as illustrated in FIG. 38; and LiveActuals reports providing up-to-the-minute feedback on project progress.

As mentioned above, the progress of an asset can be reported in detail by week, artist, sequence, character, component, or summarized for an entire department. Specific tasks can also be tracked by artist or status. Therefore, above-mentioned reports provide the progress of an asset and enable analysis of work performance by a supervisor, a director, a producer, and others who are assigned to analyze the performance, efficiency, and effectiveness of media production. For example, the work performance can be measured by comparing the bid numbers with cost and time reports, and analyzing the efficiency of a department, artist, project, or task.

Referring back to the illustrated implementation of FIG. 3, the management tool 302 manages assets using VnP 320, a scene graph 322, and an asset tree 330. In one example, the asset tree 330 hierarchically represents relationships between assets, and thus, enables easy navigation between assets within a movie. In another example, the scene graph 322 represents a unit of a run-time environment whose structure contains all the objects in a scene or location and their relationships. The relationships define how different objects are transformed, for example, if a box is on a table, and the table is moved, then the box moves with the table.

Using asset information that indicates relationships between an asset or its information and other assets and other items, relative structures and information can be established. Dependencies are established through data dependencies. For example, a particular asset depends upon another asset, such as completing the lighting for a shot (asset) depends upon the completion of all the models (also assets) for that shot. In this way, a user can determine what must be completed before a shot can be completed. Similarly, a user can determine whether it is safe to change an asset based on whether the asset is dependent upon an asset that is not complete (or the restriction could be automatically enforced). Alternatively, using an approval status of related assets or tasks for an asset, it can be clear to users whether an asset should be used for later dependent assets and work in its current state. In one implementation, customized status information can be generated by users, such as "approved for use in Shot A only".

Alternatively, instead of or in addition to data dependencies, task dependencies can be used. For example, for a particular asset, a pipeline of tasks is defined. The tasks have defined dependencies, which can be set automatically, such as from a pipeline template for an asset type, or set manually, or a combination. For each task in the pipeline, an estimated amount of time is set. Using a start date for the first task, the dates for the rest of the tasks can be estimated. As the work on the asset progresses, the dates for the dependent tasks can be updated.

Different types of dependencies can be used for the same asset. For example, some tasks can be performed when as asset reaches one point in a pipeline or development, while other tasks must wait for a later stage of development of the asset.

In reverse, a user could determine what other assets are being held up by work not completed for a particular asset. If an asset needs to be fixed, a user can determine what other assets and tasks will be affected (e.g., held up or also requiring subsequent modification).

In combination with other asset information, the dependencies can be used to access many useful items. For example, using the dependencies of assets and that each asset has an assigned artist, a user can determine what assets are being held up by whom (i.e., a particular artist).

The assets and asset information are not fixed. At the beginning of production, the initial set of assets and information for those assets can be entered (e.g., based upon the agreement or bid for production of a movie or portion of the movie). At this stage, default asset information, tasks, and dependencies can be defined (e.g., using standard templates and pipelines). Thus, a pipeline represents a sequence of steps or tasks needed to build rendered frames or assets. For each step, one or more tasks can be performed to build a component product (or asset). Thus, a group of products built in a pipeline with defined dependent tasks can form an asset.

After initial production begins (e.g., once layout is completed), adjustments are made for the particular project (e.g., changing dependencies and tasks). As assets are completed their dependencies can be confirmed or updated again, such as to indicate what other assets are included in that asset (e.g., a final composite is composed of rendered frames, or an animation asset is dependent on geometry and rig assets while a lighting asset is dependent on the animation asset, texture assets, and a materials asset).

Figure 4:
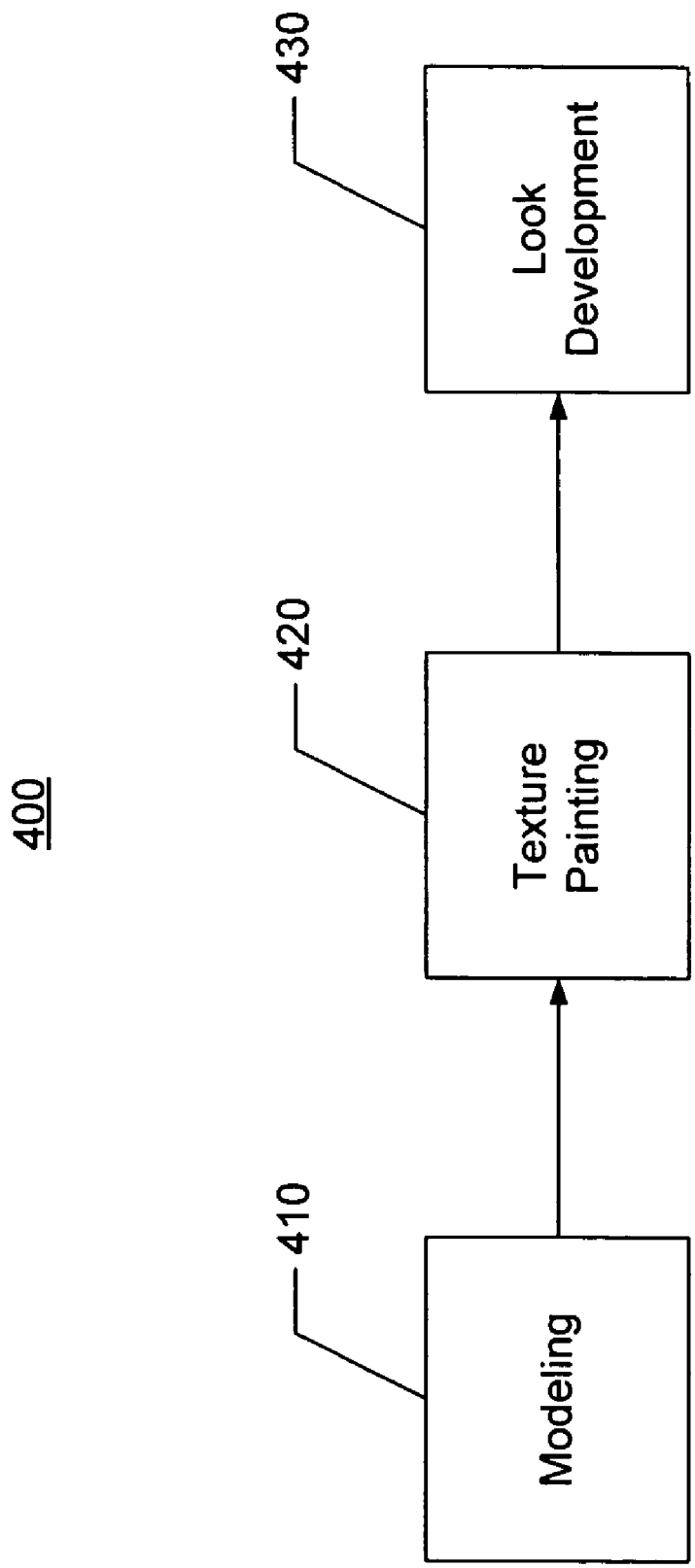
FIG. 4 shows one implementation of an environment modeling pipeline that illustrates dependencies and relationships among assets in an environment modeling.

FIG. 4 shows one implementation of an environment modeling pipeline 400 that illustrates dependencies and relationships among assets in an environment modeling. The pipeline 400 includes modeling 410, texture painting 420, and look development 430. Modeling 410 generates component products as soon in the pipeline as possible, and at the latest when the component group is published. Texture painting 420 has a tracking product for each component that provides a mechanism for determining whether texture painting has been done for a product. Texture painting 420 also has a product group, where a single group specifies the set of textures (color, bump, transparency, etc.) for a model or component. Look development 430 defines all the technical aspects needed to create the appearance of a 3-D element.

Figure 5:
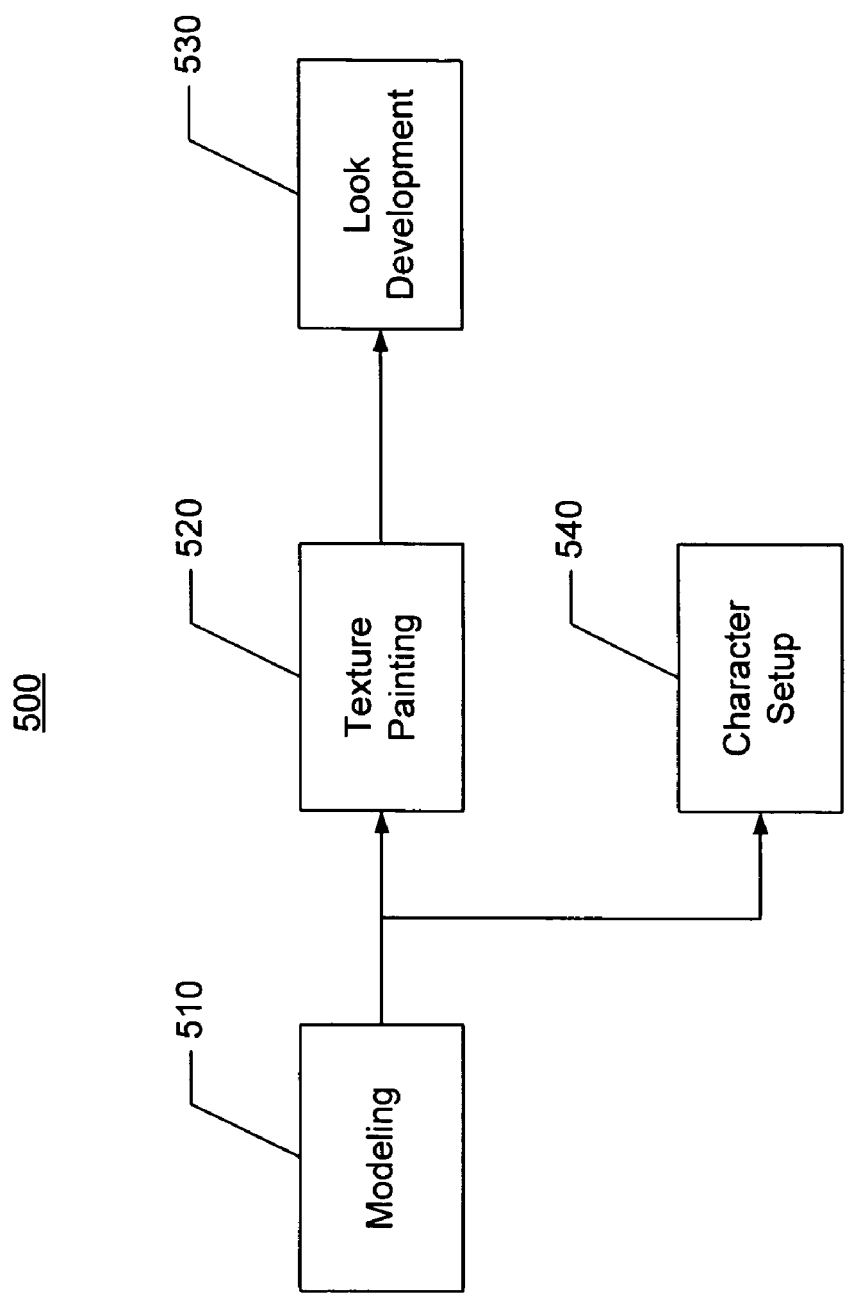
FIG. 5 shows one implementation of a character pipeline that illustrates dependencies and relationships among assets in a character.

FIG. 5 shows one implementation of a character pipeline 500 that illustrates dependencies and relationships among assets in a character. The pipeline 500 includes modeling 510, texture painting 520, character setup 530, and look development 540. Character setup 530 prepares assets for a character, such as hair, cloth, makeup, and other related assets.

Figure 6:
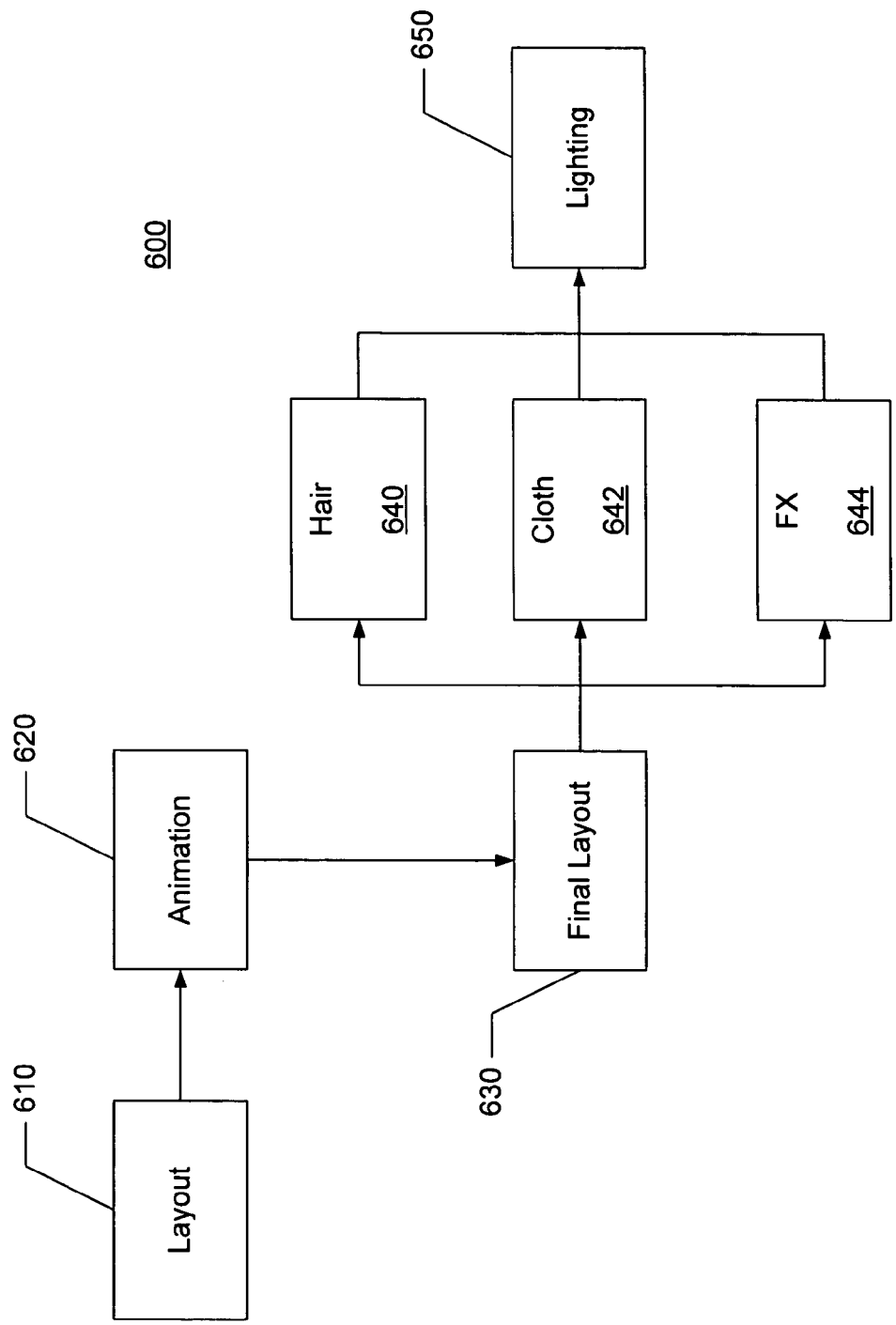
FIG. 6 shows one implementation of a shot pipeline that illustrates dependencies and relationships among assets in a shot or sequence of shots.

FIG. 6 shows one implementation of a shot pipeline 600 that illustrates dependencies and relationships among assets in a shot or sequence of shots. The pipeline 600 includes layout 610, animation 620, final layout 630, materials, such as hair 640, cloth 642, and effects 644, and lighting 650. Using storyboard sketches as a reference, layout 610 sets the stage for animation 620 by placing the objects and characters in the scene and defining the camera motion and rough object motion for the scene. At this point, the models/characters are often placeholders for the final geometry. Animation 620 animates models/characters and provides personality to bring the models/characters to life. In final layout 630, final geometry is placed into the scene to replace any placeholders. The final layout 630 also allows refinement of camera. Further, hair 640, cloth 642, and effects 644 are configured to ensure there are consistent ways of tracking whether hair and cloth has been done for a character. Lighting 650 is the placement of lights into the scene, along with any manipulation of objects and materials for characters. Thus, lighting 650 gives a two-dimensional image on the monitor an illusion of the third dimension depth, and provides an image its personality and character.

Figure 7A:
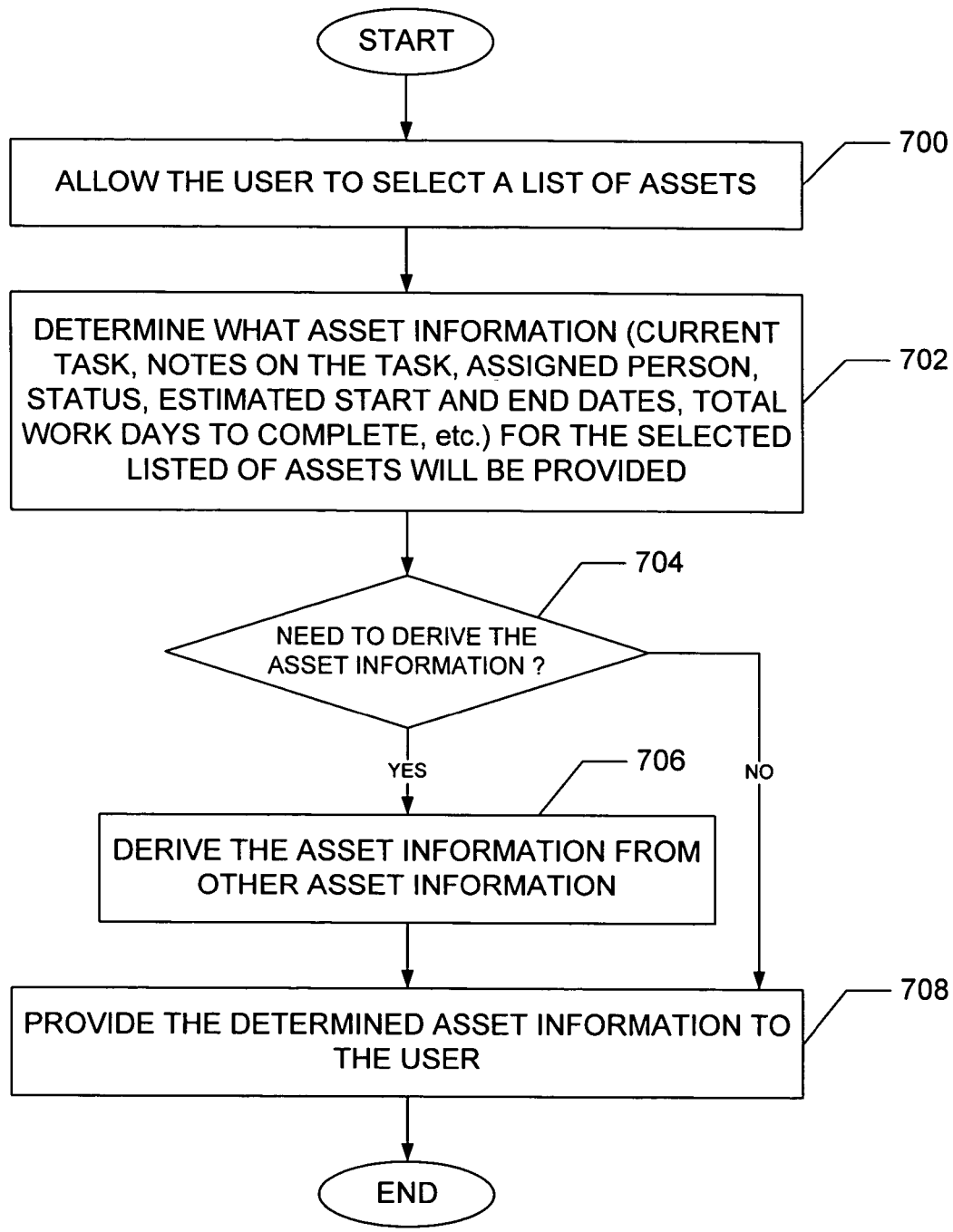
FIG. 7A illustrates a scheduling interface method for providing a view into the asset information focused on tracking the status of task for assets.

FIG. 7A illustrates a scheduling interface method for providing a view into the asset information focused on tracking the status of task for assets. The scheduling interface method can be implemented on Schedulomatic 208 of FIG. 2.

A user is allowed to select a list of assets or retrieve a list of assets through a search, at 700. A determination is made, at 702, as to what asset information for the selected assets will be provided. The asset information includes current task, notes on that task, the person assigned to the asset and task, status, estimated start and end dates, estimated total work days to complete (e.g., from a bid), actual start and end days (e.g., input by artists as work progresses), actual total days worked to complete, actual completion percentage by number and graph, comparisons between estimates and actual times, and a Gantt chart.

Since some of the information presented can be derived (e.g., the variance between estimate and actual time), a determination is made, at 704, what asset information needs to be derived. The desired asset information is derived, at 706, if it is determined that the asset information needs to be derived from other asset information. The determined asset information is then stored in a storage, and is provided to the user, at 708, by retrieving the information from the storage.

In one implementation, the desired asset information is a summary task, which is split into a plurality of sub-tasks. The summary task can be derived from the sub-tasks (i.e., other asset information). The artists and coordinators enter data into the sub-task and the data is then summarized to the summary task above. Thus, each task has a flag that defines whether the task is a summary task or sub-task.

Figure 7B:
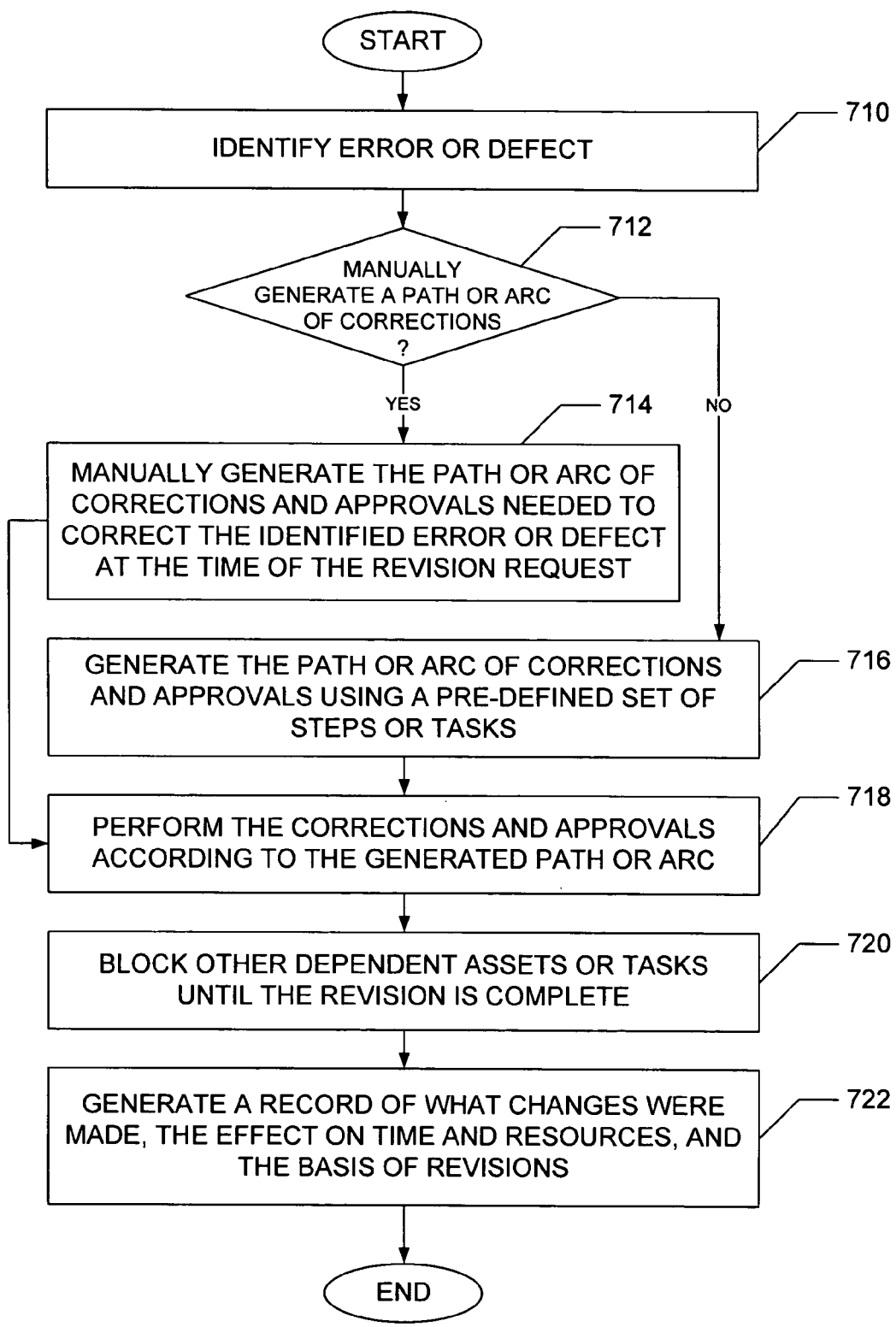
FIG. 7B illustrates a revision interface method for tracking the changes that are being made to an asset when a correction is needed.

FIG. 7B illustrates a revision interface method for tracking the changes that are being made to an asset when a correction is needed. To correct an asset, the workflow for that asset may be "reversed", and previously completed tasks may be re-done. The revision interface method can be implemented on KickIt 212 of FIG. 2.

Thus, to perform the revision, an error or defect is identified, at 710. The repetition of tasks is not necessarily linear and so the revision interface method provides a path or arc of corrections and approvals needed to correct the identified error or defect (and other implied corrections) and return the asset back to the point in production where the error was identified. For example, if there were steps 1 through 10 that have already been performed and an error was found on step 3, then a manual arc of corrections may include a list of steps 3, 6, 7, 9, and 10 that needs to be re-done.

A determination is made, at 712, whether the path or arc of corrections should be manually generated. The path or arc of corrections is manually generated at the time of requesting a revision, at 714, if manual generation is requested at 712. If automatic generation is requested at 712, the path or arc of corrections and approvals is generated, at 716, using a pre-defined set of steps or tasks (similar to a pipeline) for commonly occurring revisions. However, some revisions may not consistently produce the same consequent revisions (e.g., depending on other factors of the asset or dependent assets), and so a manual arc is used (or a branching arc can also be used). The corrections and approvals are performed, at 718, according to the generated path or arc. Then, depending on the type of revision needed, the asset may cause other dependent assets or tasks to become blocked, at 720 (not usable until the revision is complete). The arc defined for the corrections needed for the requested revision can form new dependencies in the new tasks. At 722, the revision method also generates a record of what changes were made, the effect on time and resources (e.g., days added because of revisions), and the basis of revisions.

Figure 7C:
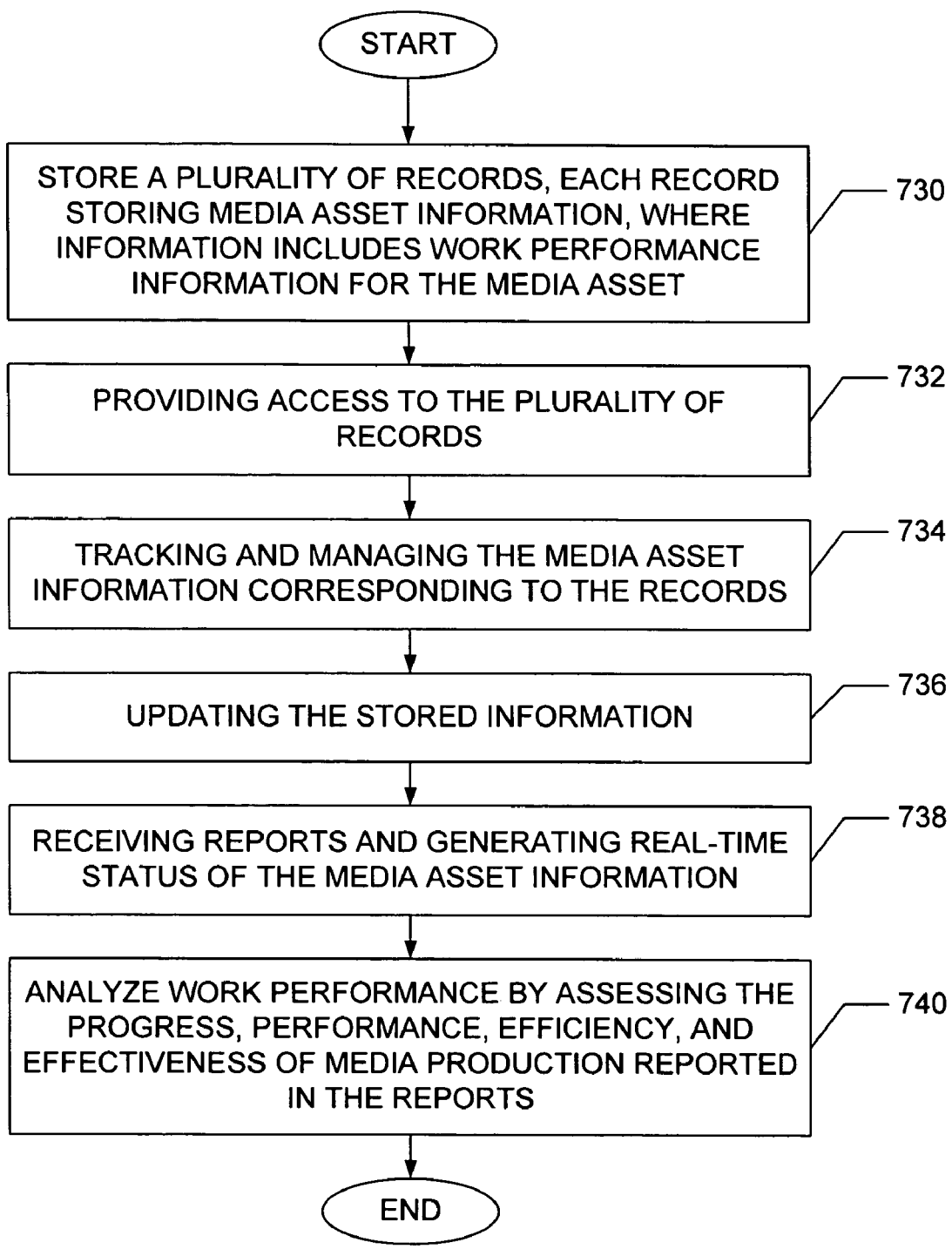
FIG. 7C illustrates a method for managing media assets in media production.

FIG. 7C illustrates a method for managing media assets in media production. The managing method can be implemented on TrackIt 210 of FIG. 2.

Initially, a plurality of records is stored, at 730. Each record stores information for a media asset, and includes work performance information for the media asset. Access to the records is provided, at 732. The media asset information is then tracked and managed, at 734. The tracking and managing of the asset information may include updating the stored information at 736; receiving reports and generating real-time status of the media asset information at 738; and analyzing work performance, at 740, by assessing the progress, performance, efficiency, and effectiveness of media production reported in the reports.

Screen shots of production tools of an asset management system are shown in FIG. 8 through FIG. 31. The production tools include a reporting tool, a revision tool, a status tool, and a scheduling interface tool.

Figure 8:
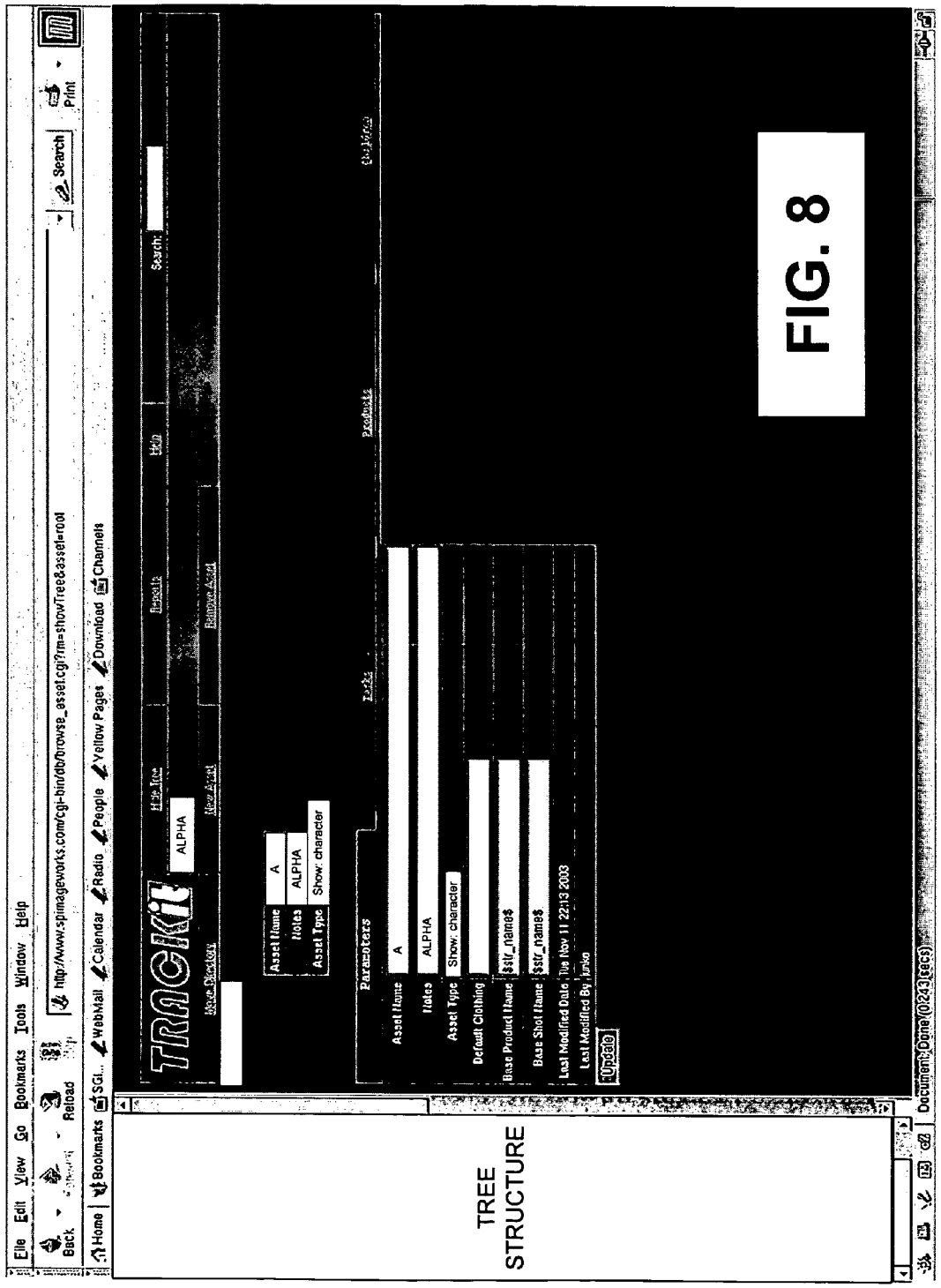
FIG. 8 illustrates one example of an asset parameters screen allowing a user to enter parameters of an asset.

FIG. 8 illustrates one example of an asset parameters screen allowing a user to enter parameters of an asset. In the illustrated example, a character asset A is selected from the asset tree structure; and parameters of asset A are defined by entering the data in appropriate query boxes. The asset parameters include name, notes, type, default clothing, base product name, and base shot name.

Figure 9:
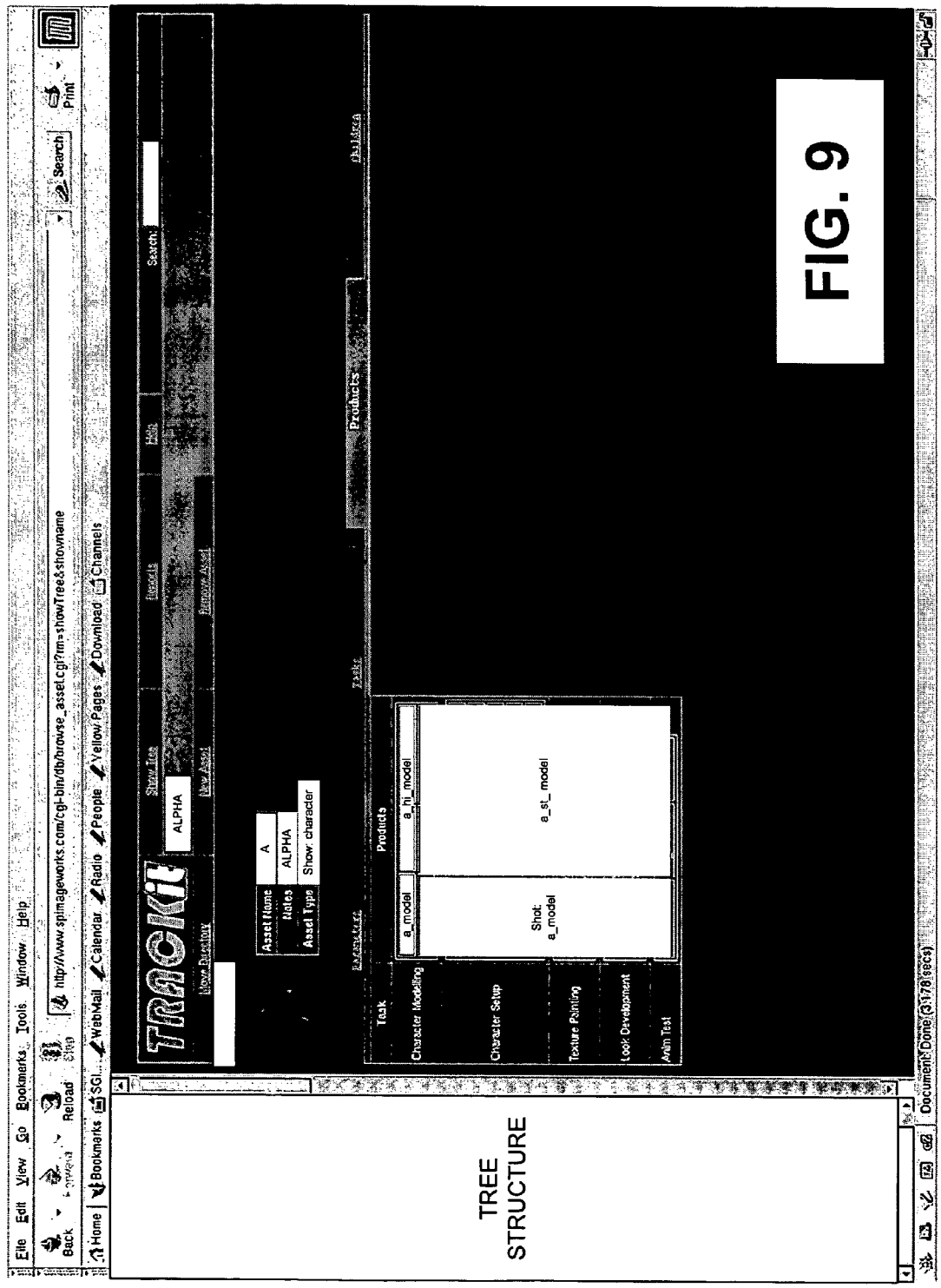
FIG. 9 illustrates one example of an asset products screen allowing a user to enter corresponding products for each task of a character asset.

FIG. 9 illustrates one example of an asset products screen allowing a user to enter corresponding products for each task of a character asset, which can also be defined procedurally using attributes on an asset node. The tasks include character modeling, character setup, texture painting, look development, and animation test.

Figure 10:
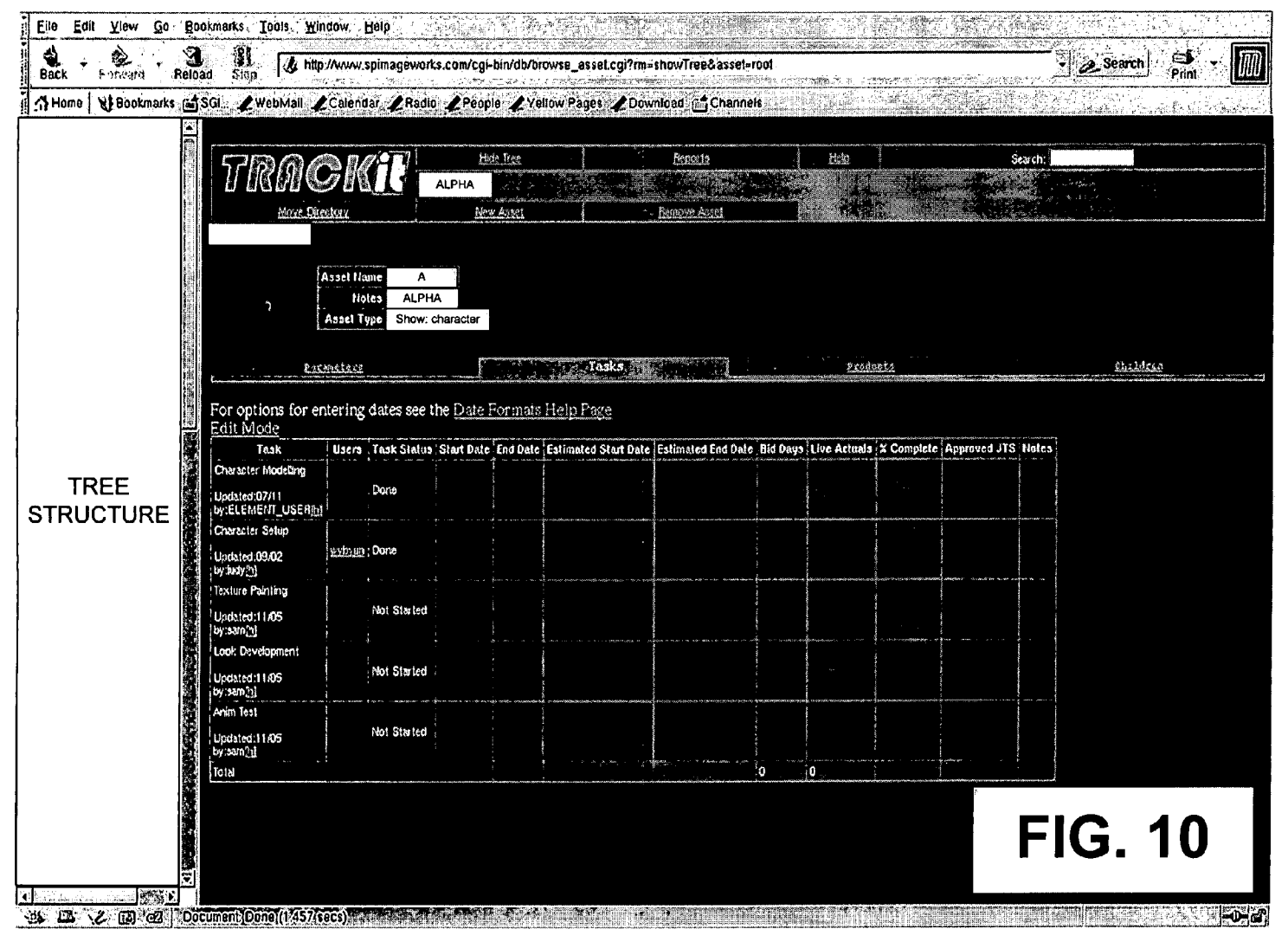

FIG. 10 illustrates one example of an asset tasks screen allowing a user to define task statuses. The tasks in this screen represent dependent tasks that need to be performed in a pipeline for an asset, such as character modeling, character setup, texture painting, look development, and animation test. Thus, for each task, the management system allows entry of at least the user-defined status, start and end dates, estimated start and end dates, bid days, and actual completion percentage for the task.

Figure 11:
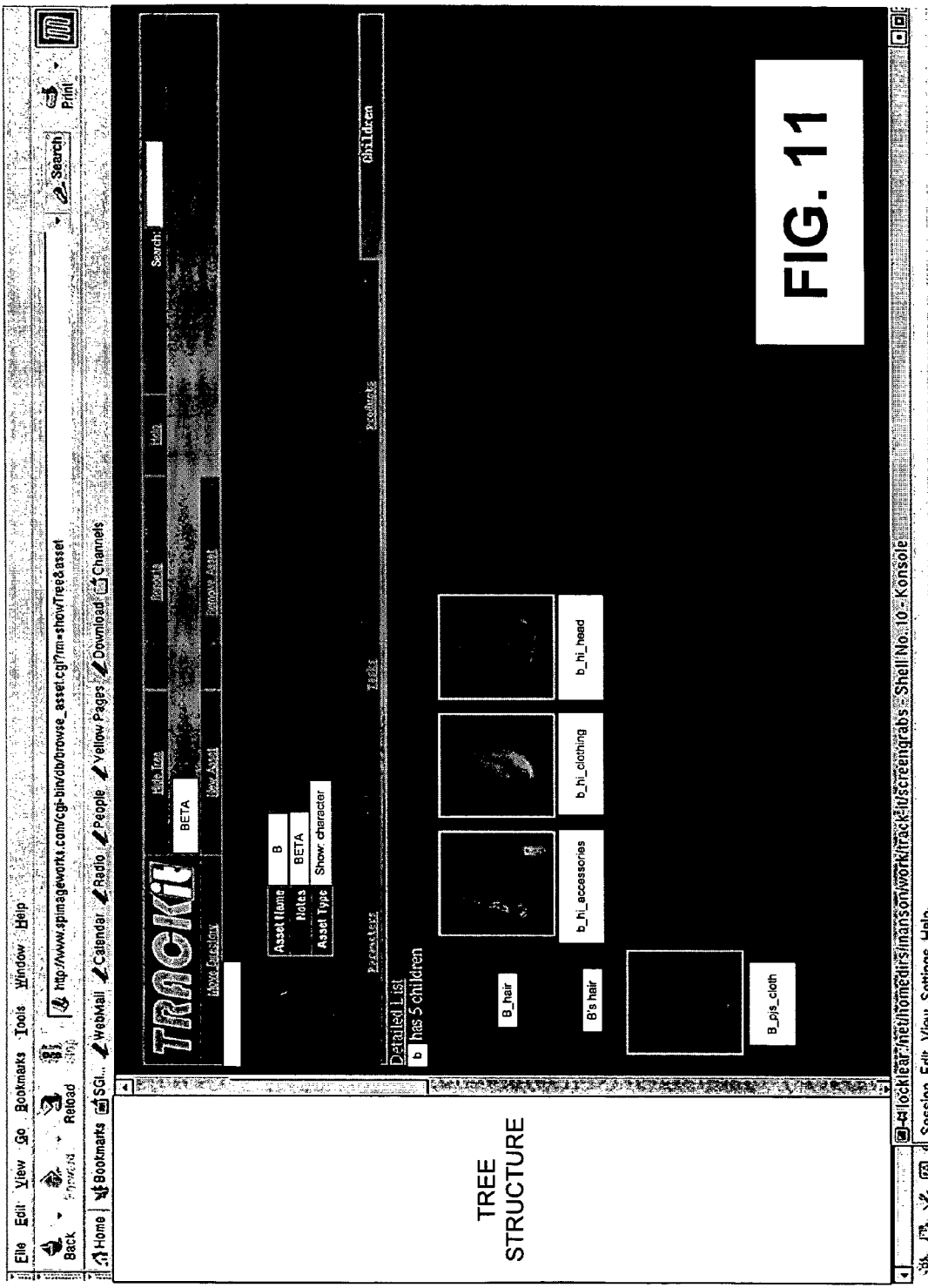
FIG. 11 illustrates one example of a children assets screen showing a detailed list of children assets.

FIG. 11 illustrates one example of a children assets screen showing a detailed list of children assets. The illustrated example shows five children assets (e.g., hair, accessories, clothing, head, and cloth) for the defined character asset B.

Figure 12:
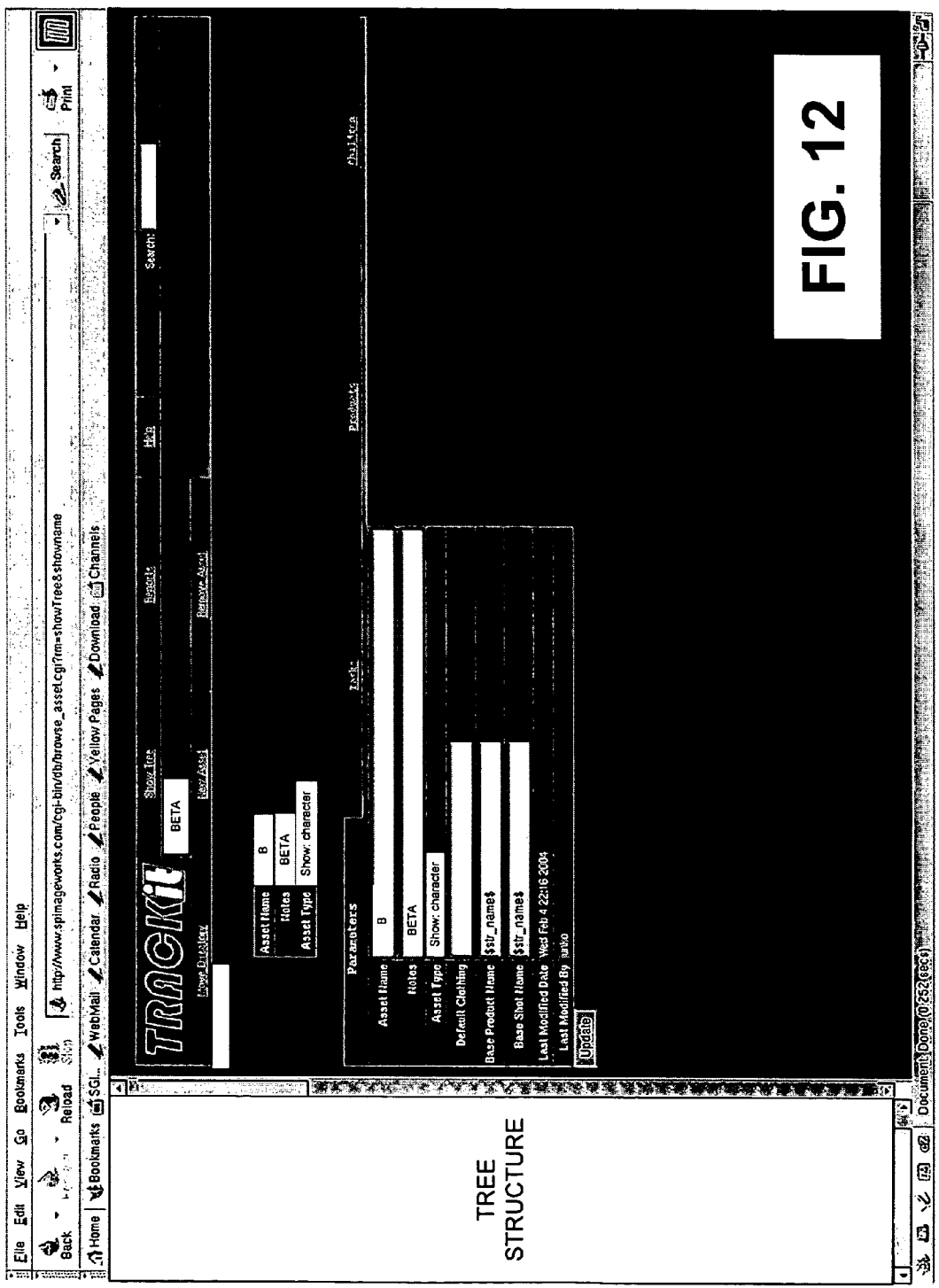
FIG. 12 through FIG. 14 illustrate examples of a parameters screen, a products screen, and a tasks screen, respectively, for an asset character B, similar to FIG. 8 to FIG. 10 for an asset character A.
Figure 13:
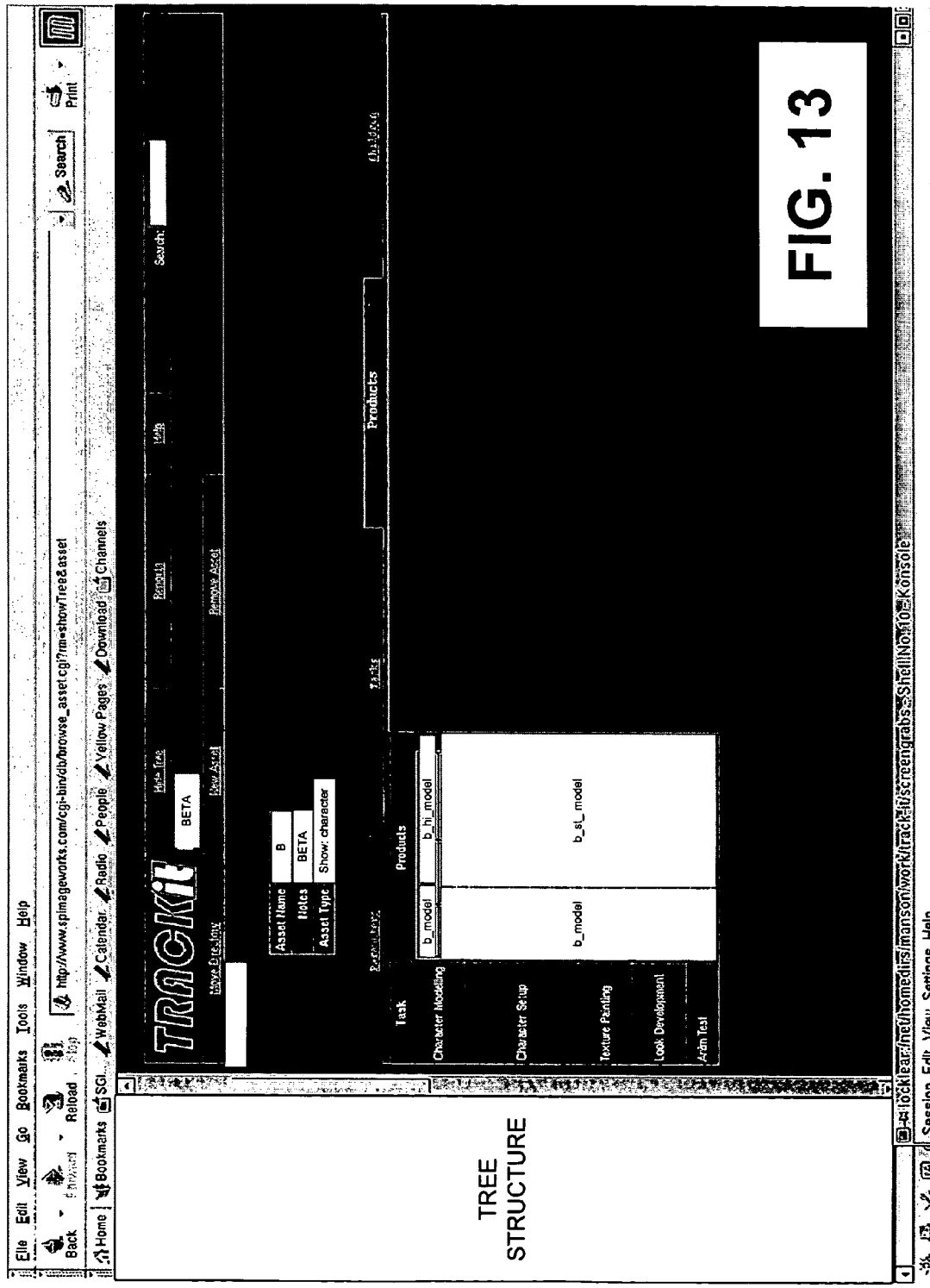
Figure 14:
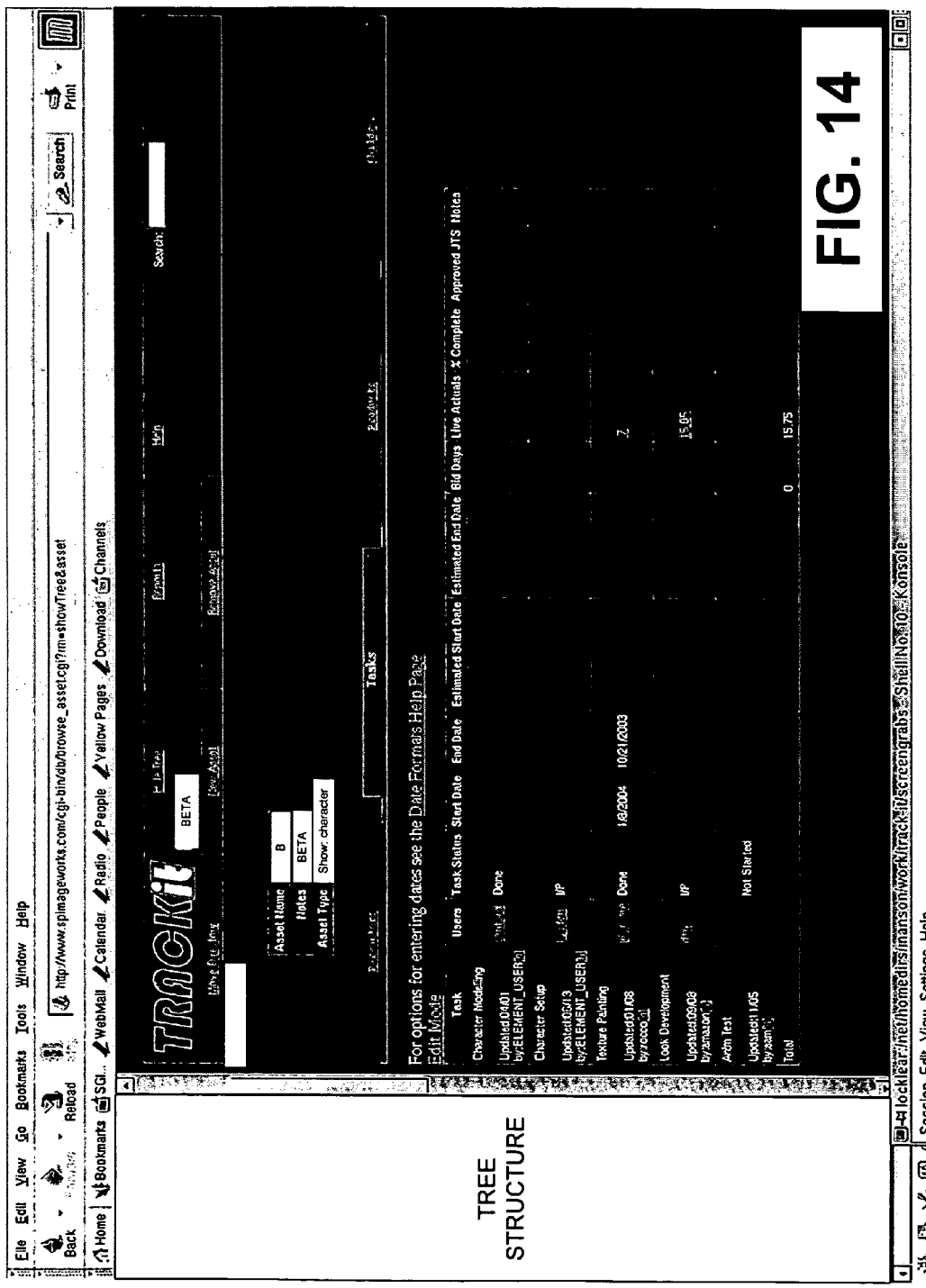

FIG. 12 through FIG. 14 illustrate examples of a parameters screen, a products screen, and a tasks screen, respectively, for an asset character B, similar to FIG. 8 to FIG. 10 for an asset character A.

Figure 15:
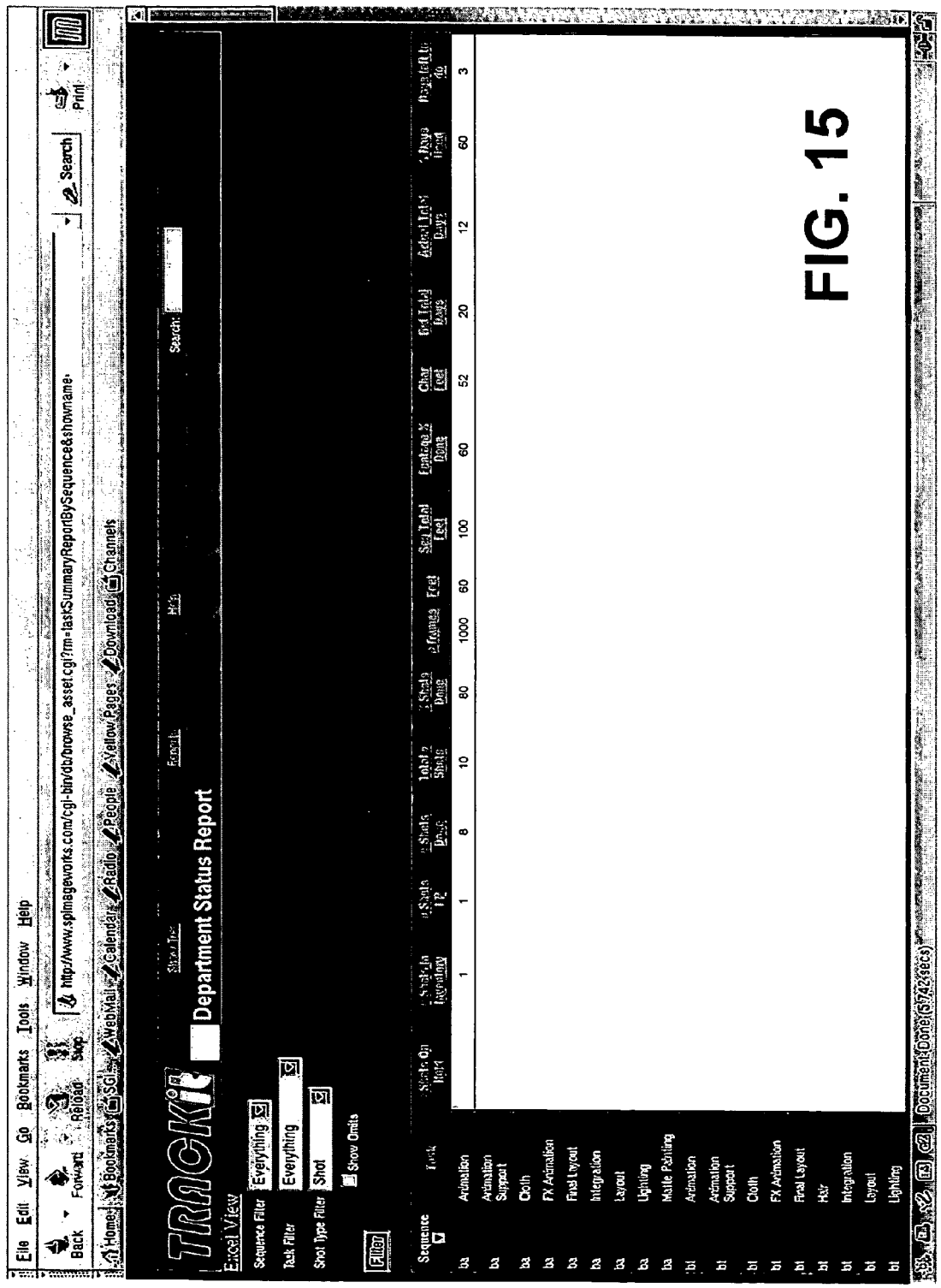
Figure 16:
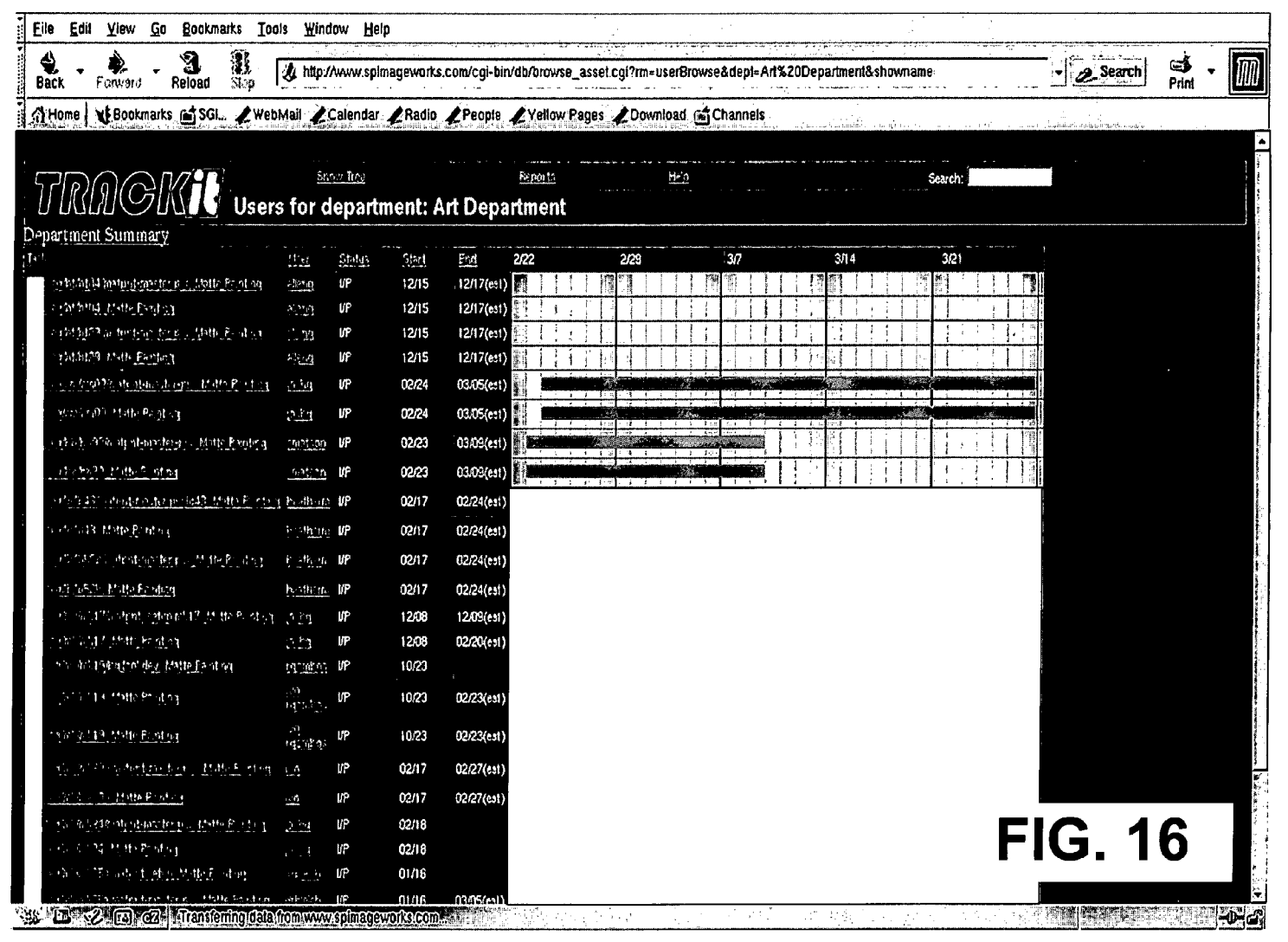

FIG. 15 and FIG. 16 illustrate examples of a status report and a summary report for a department of a media production company. In the illustrated example for the summary report, the report is generated for an art department indicating task schedules for individuals in the art department.

Figure 17:
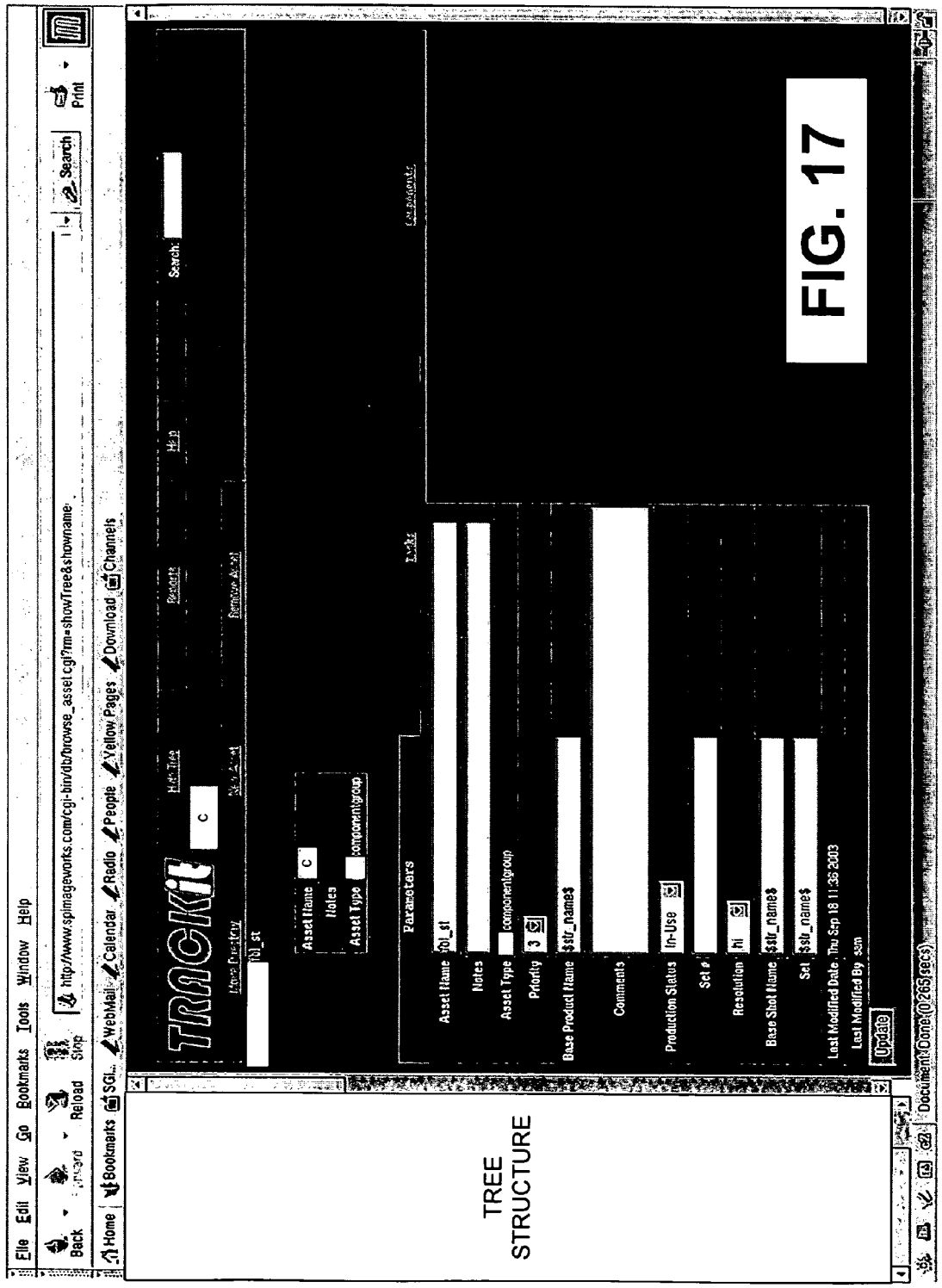
FIG. 17 and FIG. 18 illustrate examples of a parameters screen and a tasks screen, respectively, for an environment modeling of an asset C, similar to FIG. 12 and FIG. 14 for an asset character B.
Figure 18:
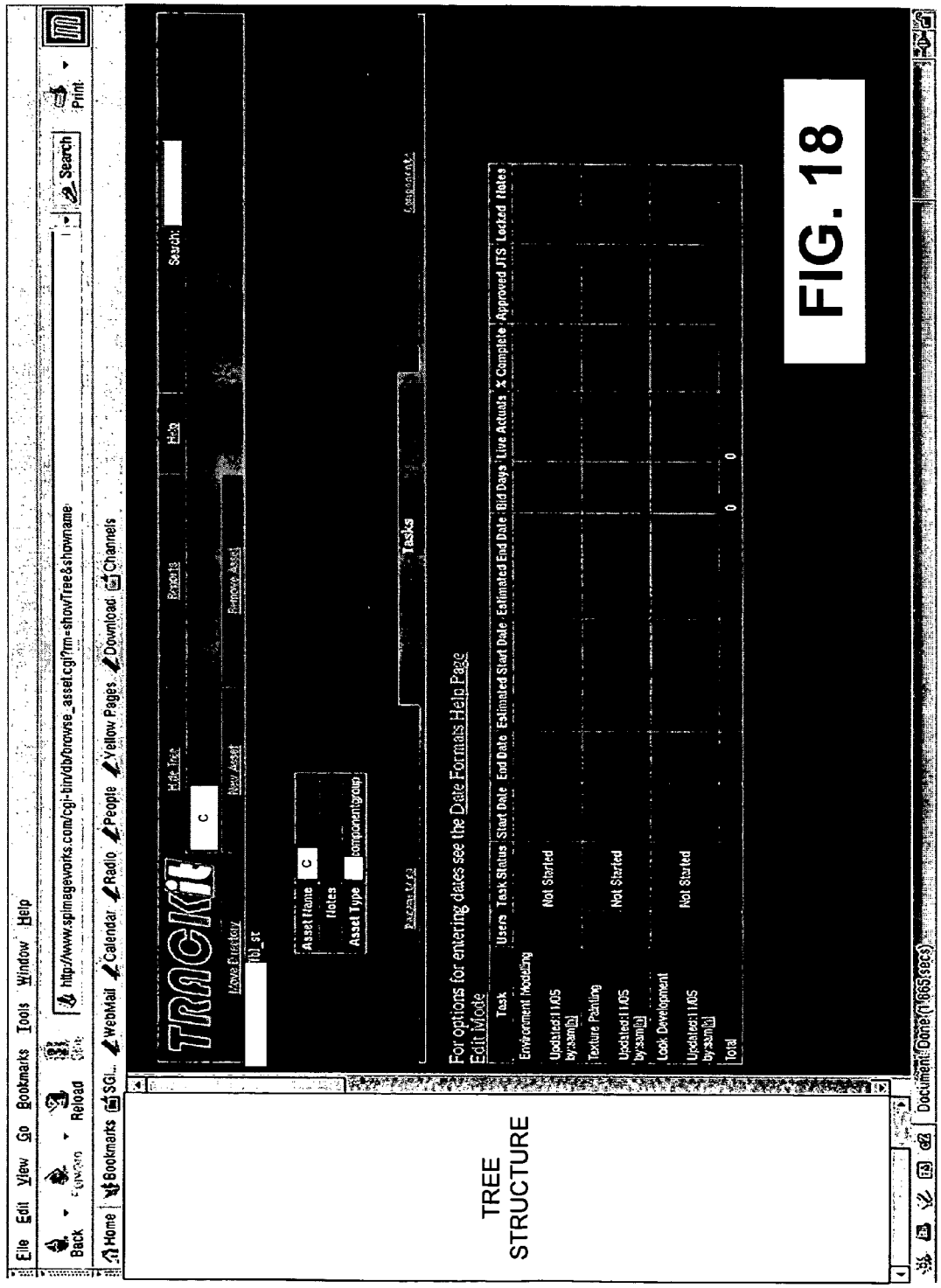

FIG. 17 and FIG. 18 illustrate examples of a parameters screen and a tasks screen, respectively, for an environment modeling of an asset C, similar to FIG. 12 and FIG. 14 for an asset character B.

Figure 19:
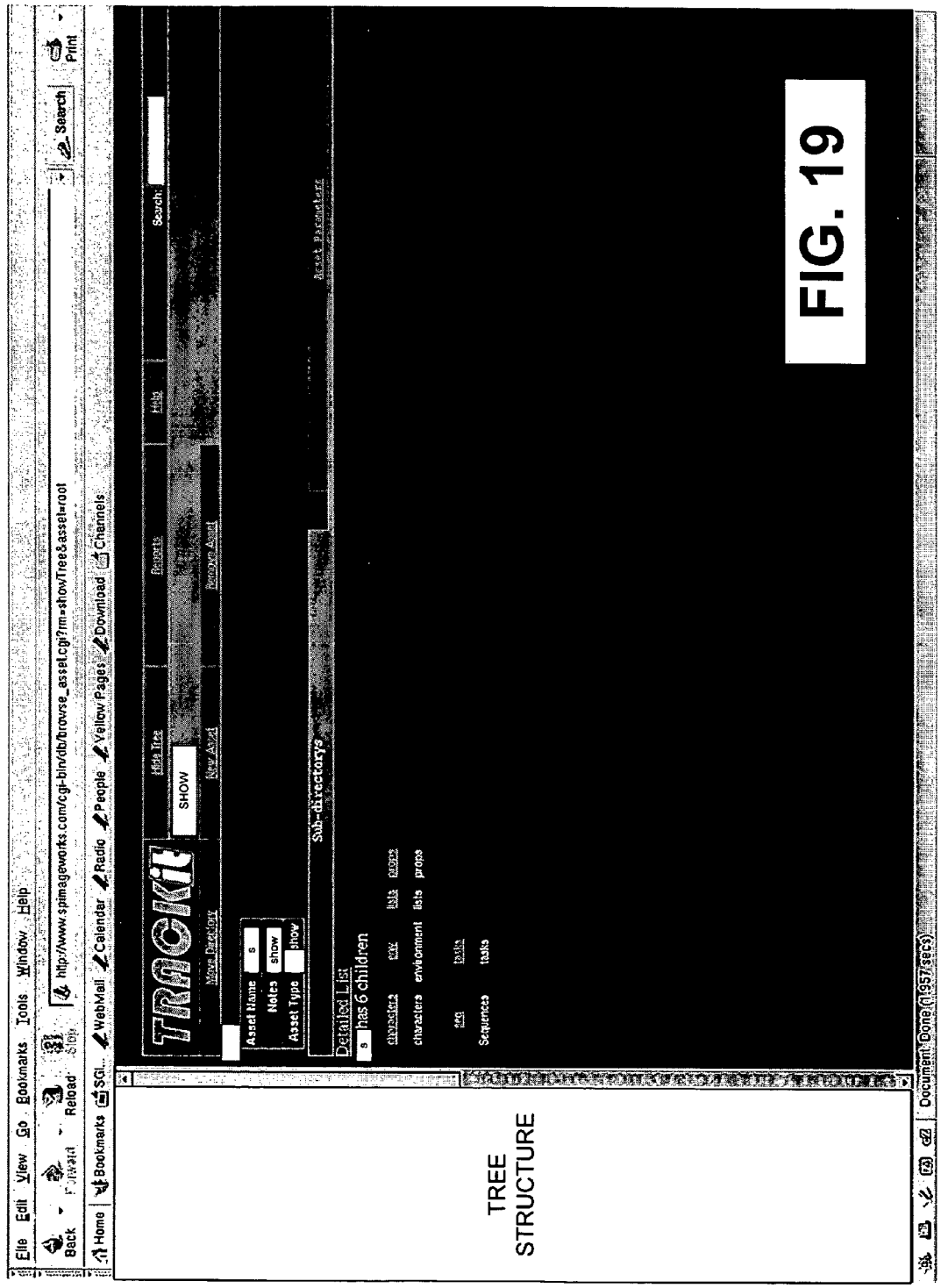
FIG. 19 and FIG. 20 illustrate examples of sub-directories screens.
Figure 20:
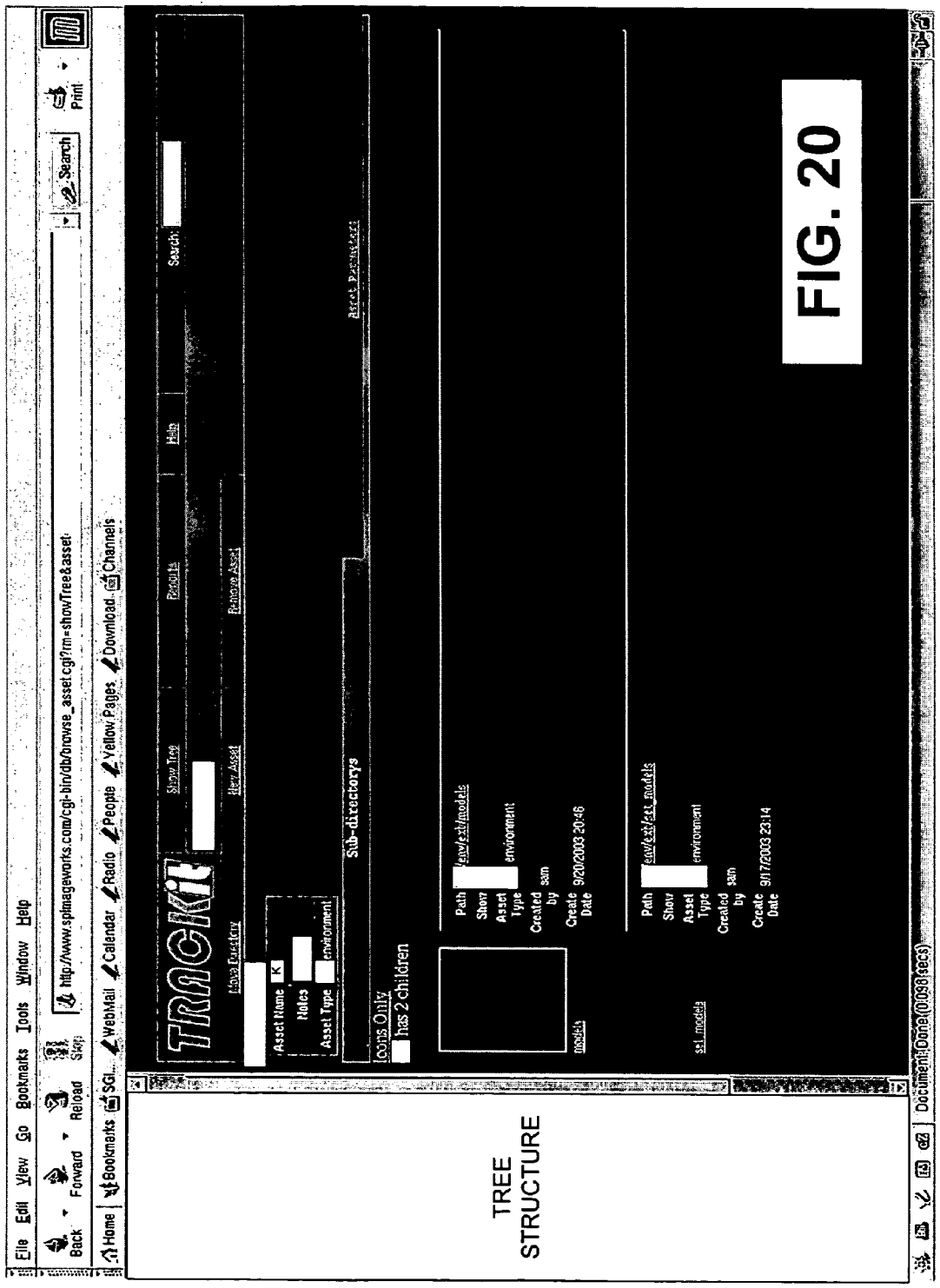

FIG. 19 and FIG. 20 illustrate examples of sub-directories screens. Specifically, FIG. 19 illustrates one example of an initial page for a sub-directories screen for an asset SHOW; and FIG. 20 illustrates an environment sub-directories screen for an asset K. The sub-directories screen of FIG. 20 illustrates two children for asset K: models and set models. For each child, the screen shows a file path, a show name, an asset type, a creator name, and a creation date.

FIG. 21 through FIG. 24 illustrate examples of a list screen, an edit list tasks screen, a list characters screen, and a list component groups screen, respectively, for an animation effects asset D.

Figure 21:
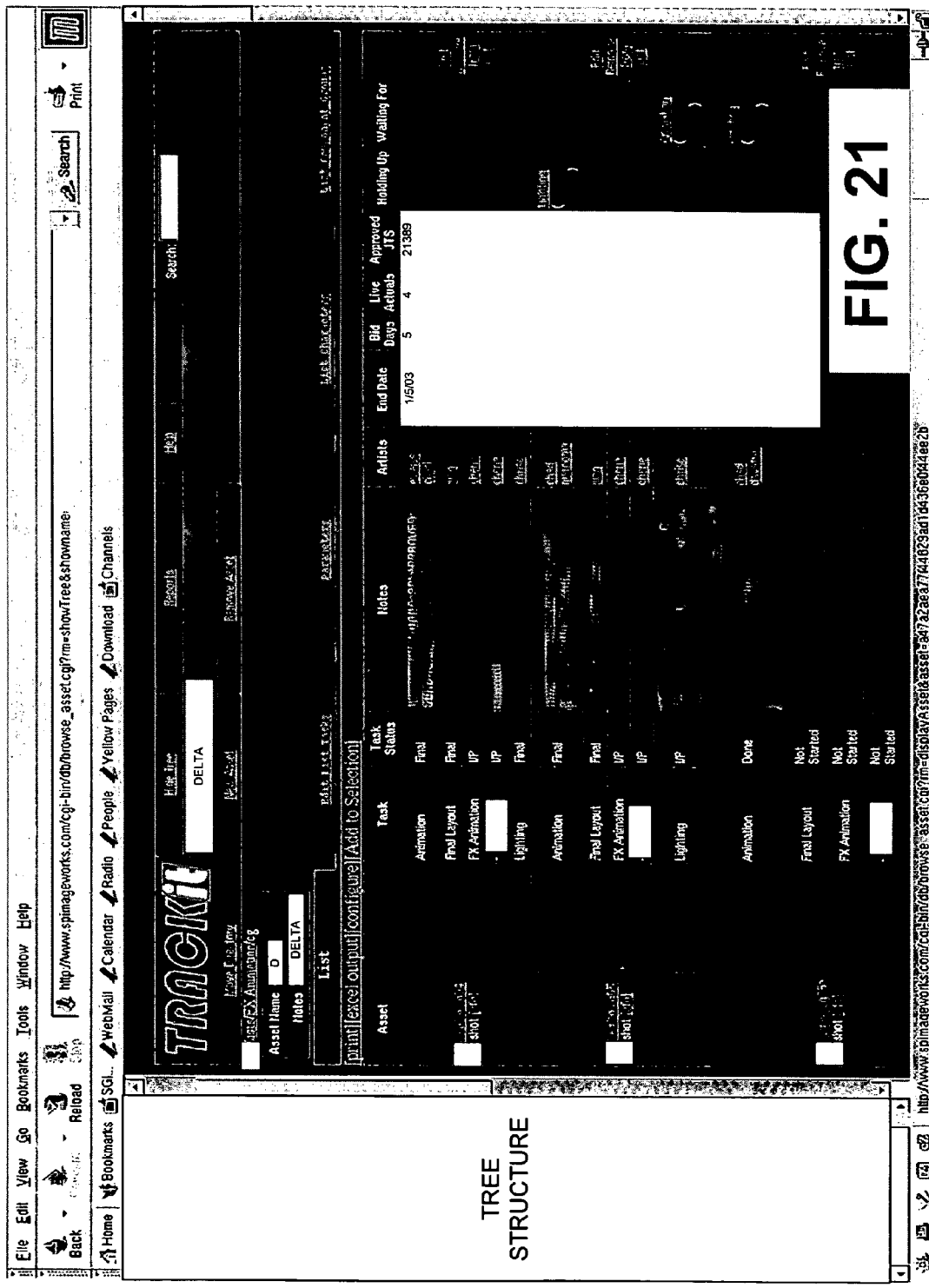
FIG. 21 through FIG. 24 illustrate examples of a list screen, an edit list tasks screen, a list characters screen, and a list component groups screen, respectively, for an animation effects asset D.

The list screen of FIG. 21 includes tasks, task statuses, notes, responsible artists, end date, bid days, 'LiveActuals' days, 'JTS Approval', 'holding up', and 'waiting for' entries for each effect. The 'LiveActuals' days entry refers to the number of days a responsible person has spent working on that task. The 'JTS Approval' entry is an approval tracking number associated with each piece of work (usually in the form of a digital video clip) submitted by a responsible person for approval.

Figure 22:
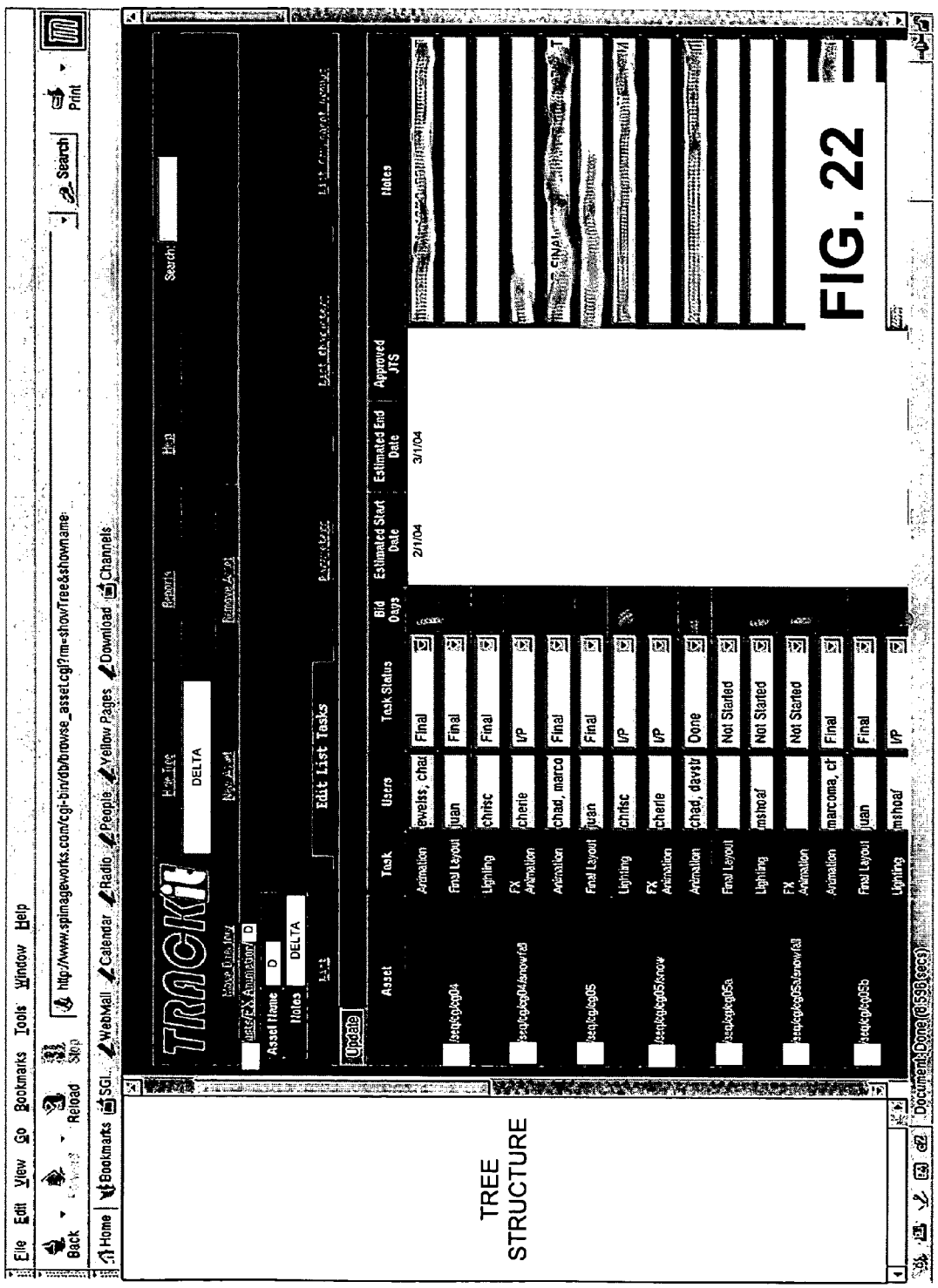
Figure 23:
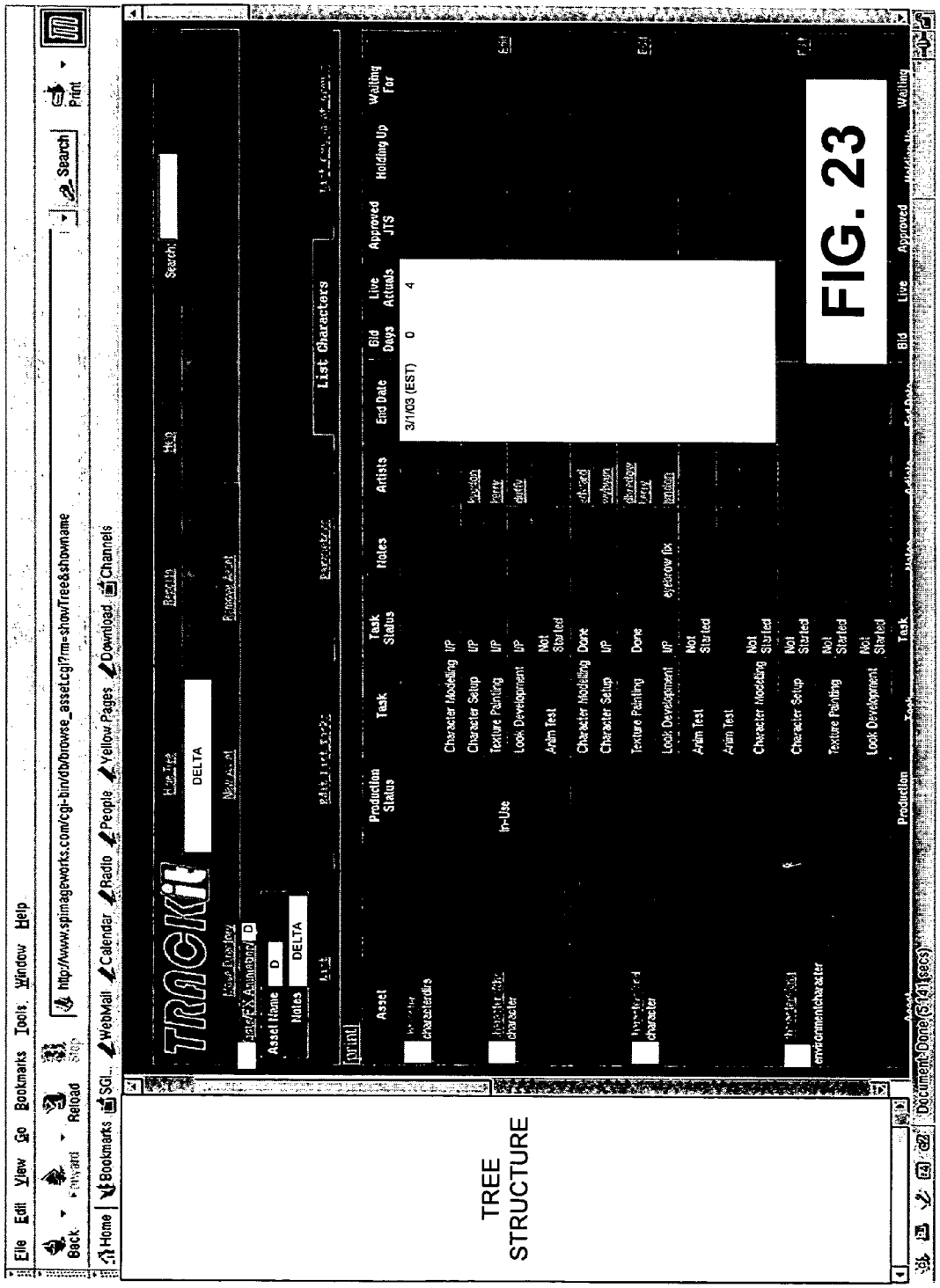
Figure 24:
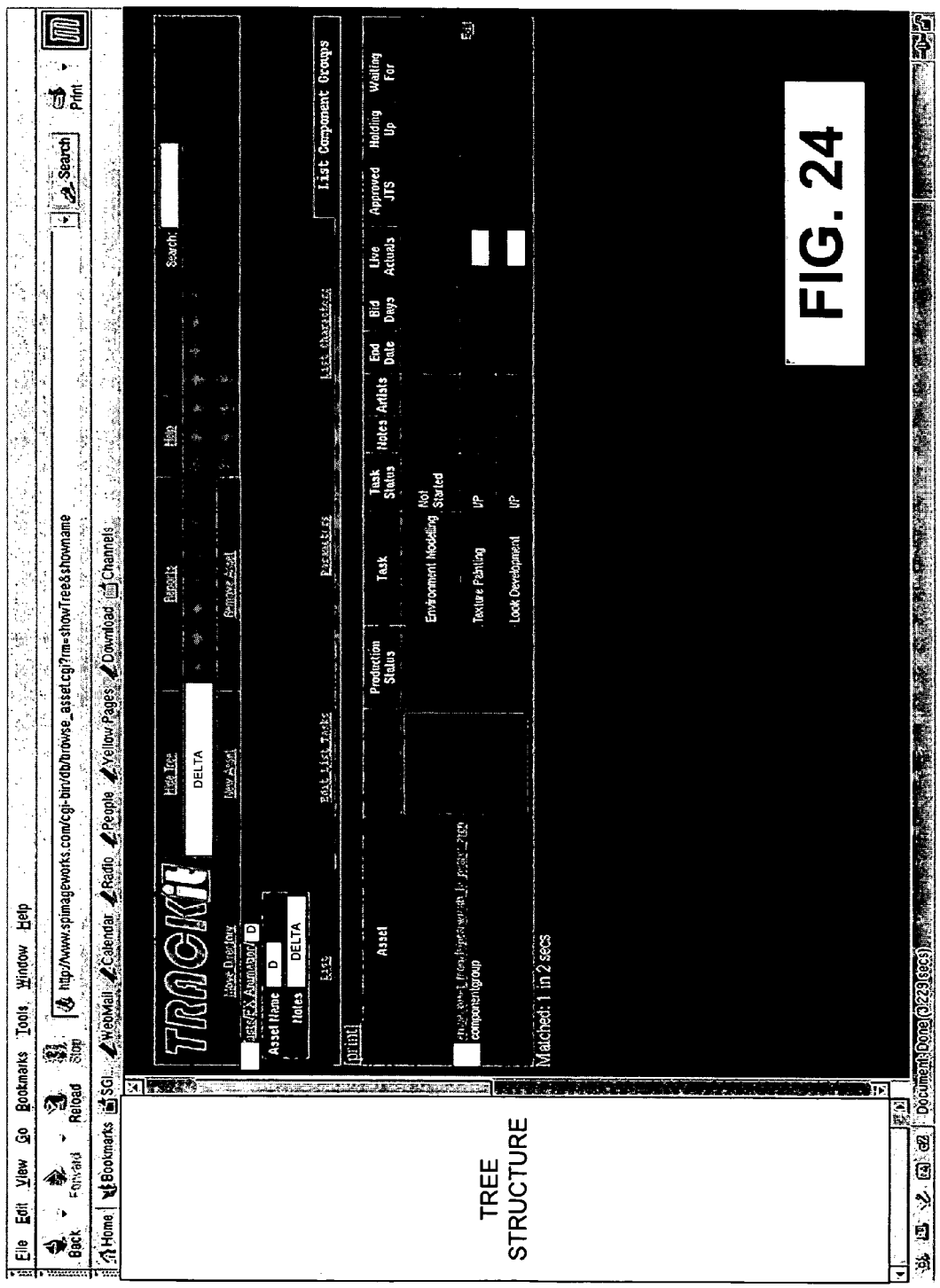

The edit list tasks screen of FIG. 22 enables the user to edit the entries in the list screen. The list characters screen of FIG. 23 includes production statuses of characters. The list component groups screen illustrates statuses of component groups.

FIG. 25 through FIG. 29 illustrate examples of real-time updates and reports on the status of assets and/or asset information prepared by LiveActuals.

Figure 25:
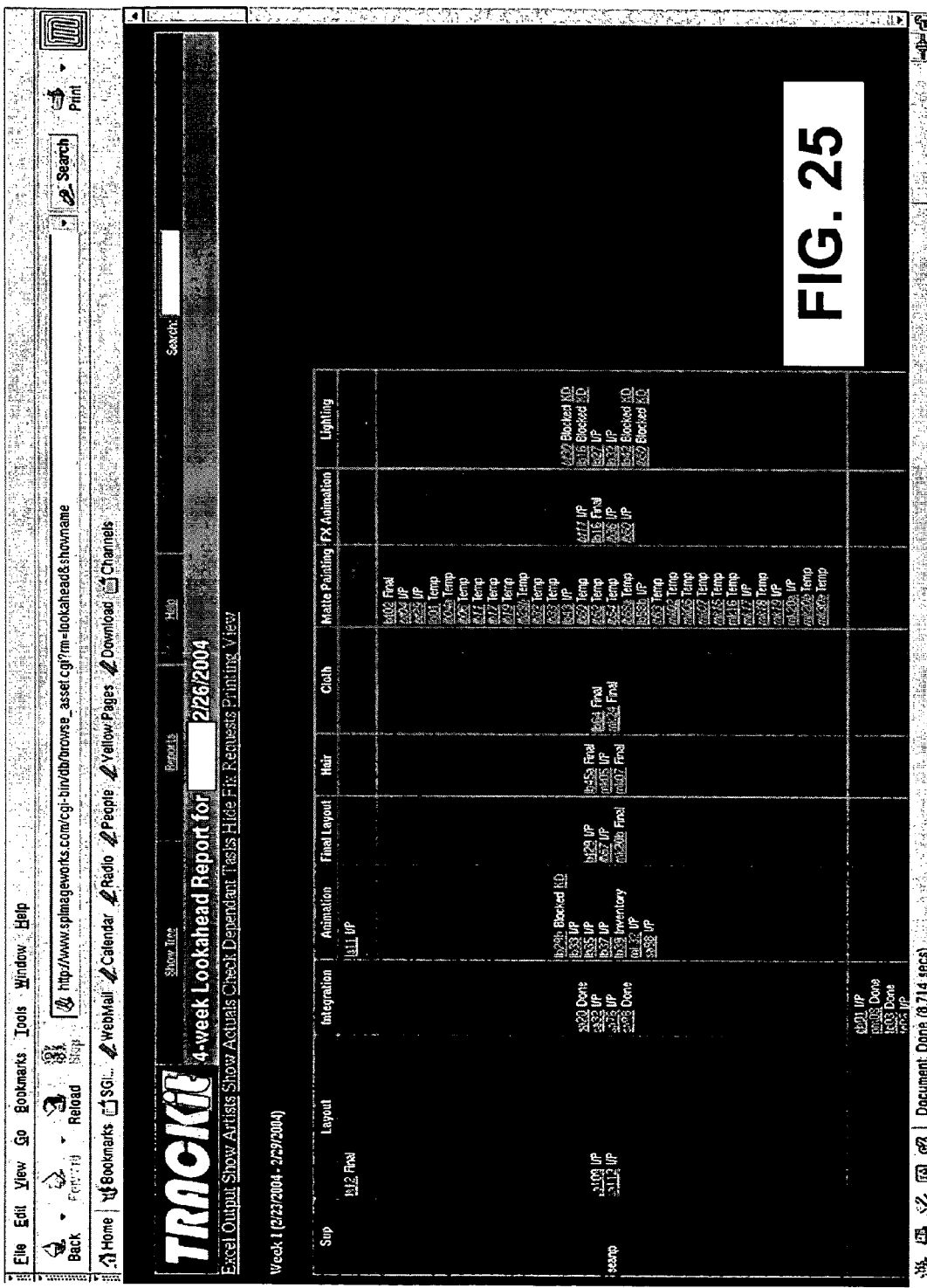
FIG. 25 through FIG. 29 illustrate examples of real-time updates and reports on the status of assets and/or asset information prepared by LiveActuals.

FIG. 25 illustrates one example of a four-week look-ahead report indicating the progress in different stages of the media production. For example, the report includes a progress summary of layout, integration, animation, final layout, hair, cloth, matte painting, effects, and lighting. Entries in the report indicate following statuses: 'I/P' means the task is in progress; 'Blocked' means that this task cannot be completed until an asset correction request in KickIt issued against this task has been resolved (i.e., until the correction request has been resolved); 'Temp' means that a temporary version of the task has been delivered so that other people can get started on their task but a more complete version of the task is expected to be completed later; 'Done' and 'Final' are used in a few select parts of a pipeline, for example, when a task such as lighting or animation is completed (e.g., when a supervisor approves the task), the task is flagged as 'done'; however, the task still needs to be reviewed by a movie director, so when the director approves the task, the task is flagged as 'final'.

Figure 26:
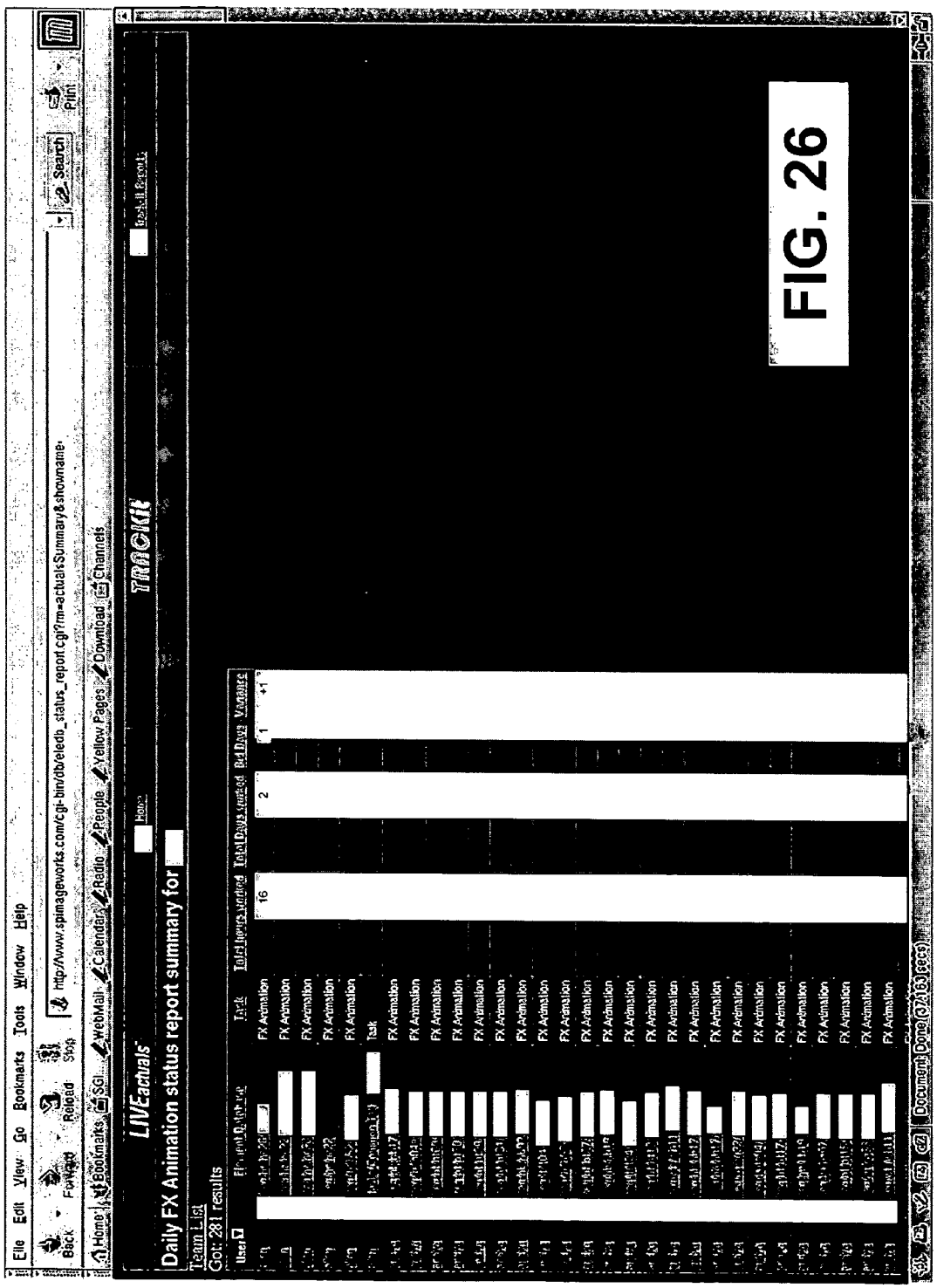

FIG. 26 illustrates an example of a summary report. The report includes a user name, a database file path, a task, total hours worked, total days worked, bid days, and a variance for each row entry.

Figure 27:
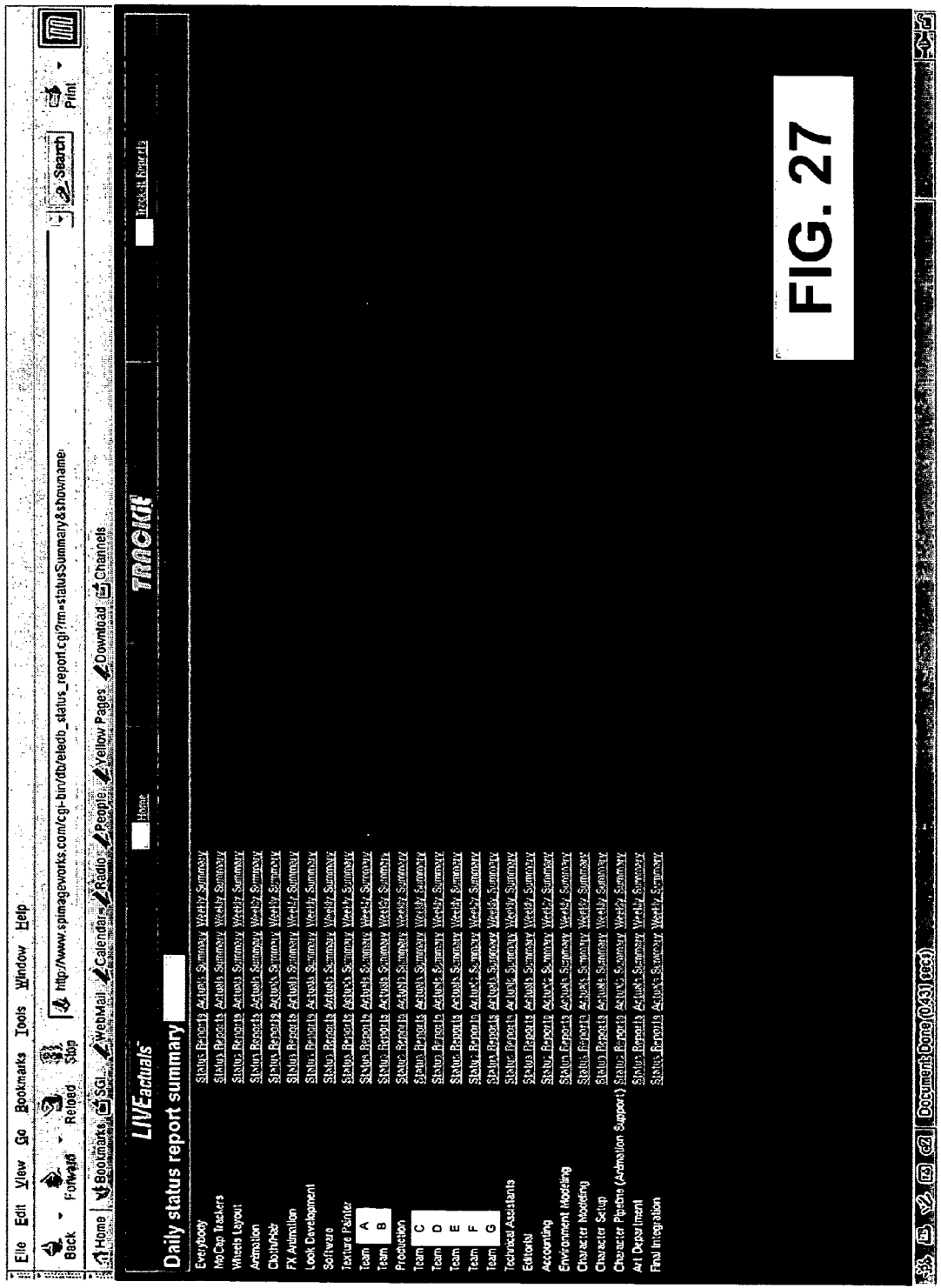

FIG. 27 illustrates an example of a daily status report summary on a home page of a real-time update interface LiveActuals. This page provides links to status summary of individuals, teams, or departments.

Figure 28:
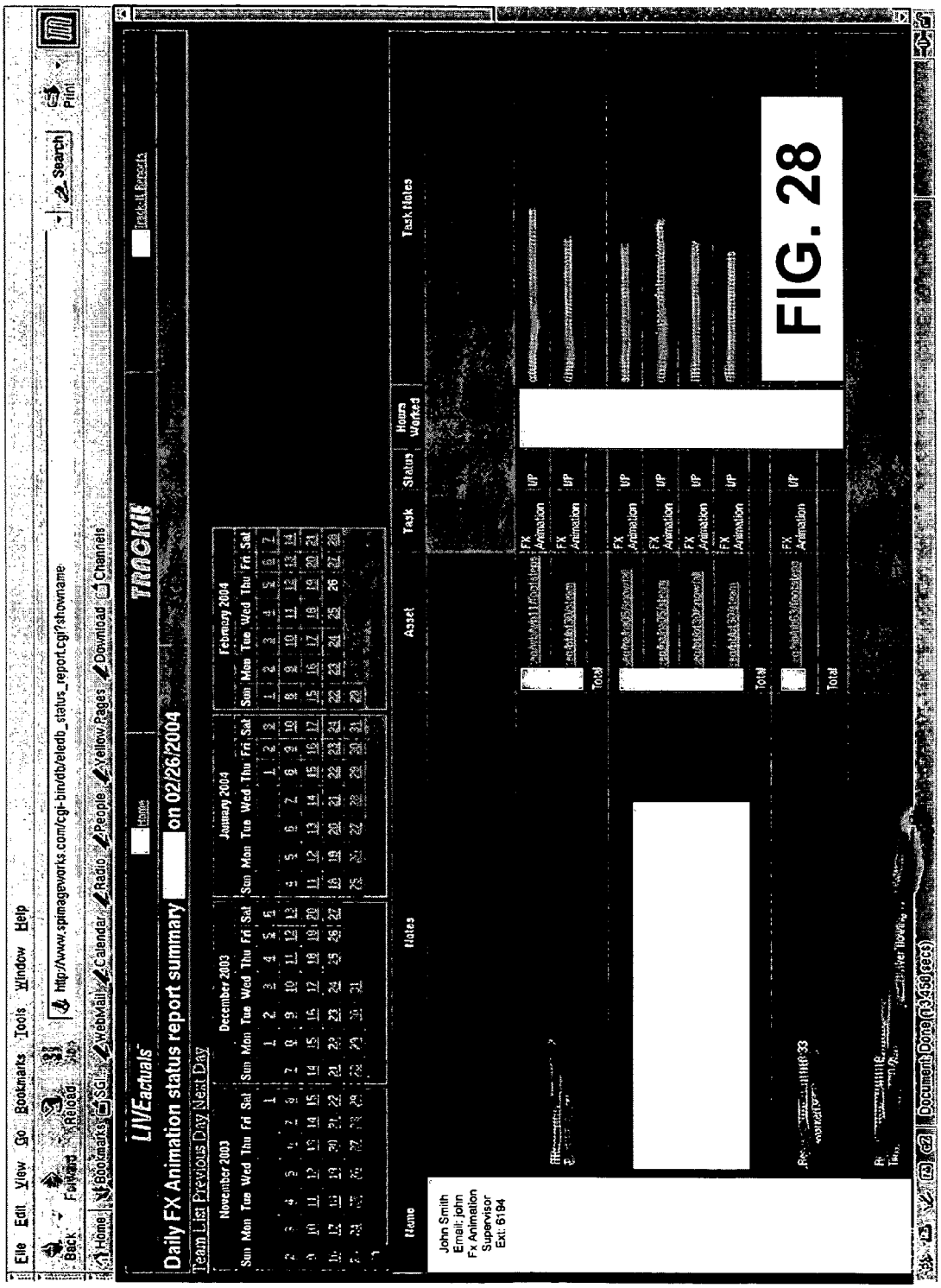

FIG. 28 illustrates an example of a daily animation effects status report summary. This report illustrates name, e-mail, phone number, notes, asset path, task, status, hours worked, and task notes for each person for a selected date.

Figure 29:
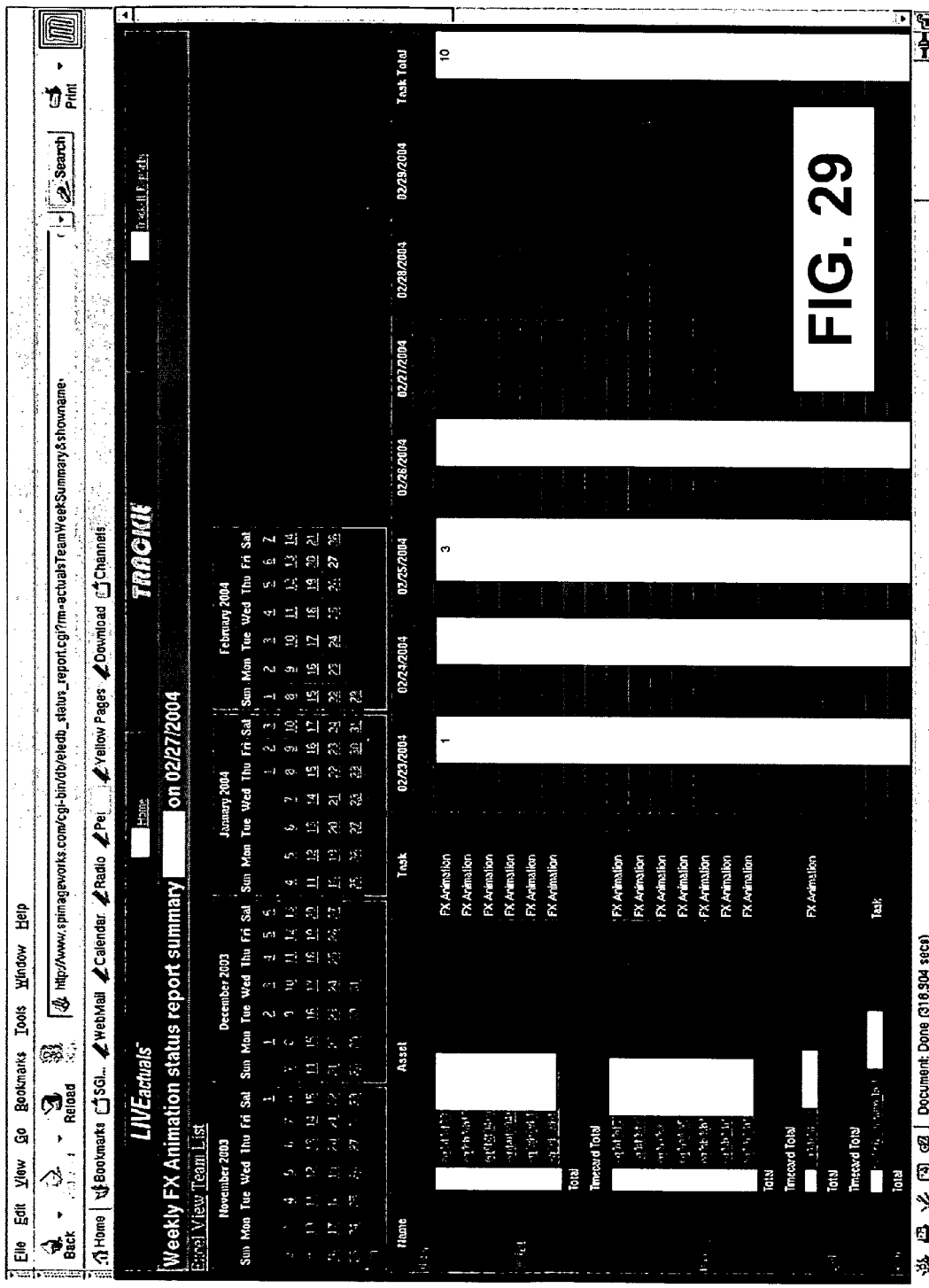

FIG. 29 illustrates an example of a weekly animation effects status report summary. This report illustrates name, asset path, task, and number of hours spent on each day of a selected week.

Figure 30:
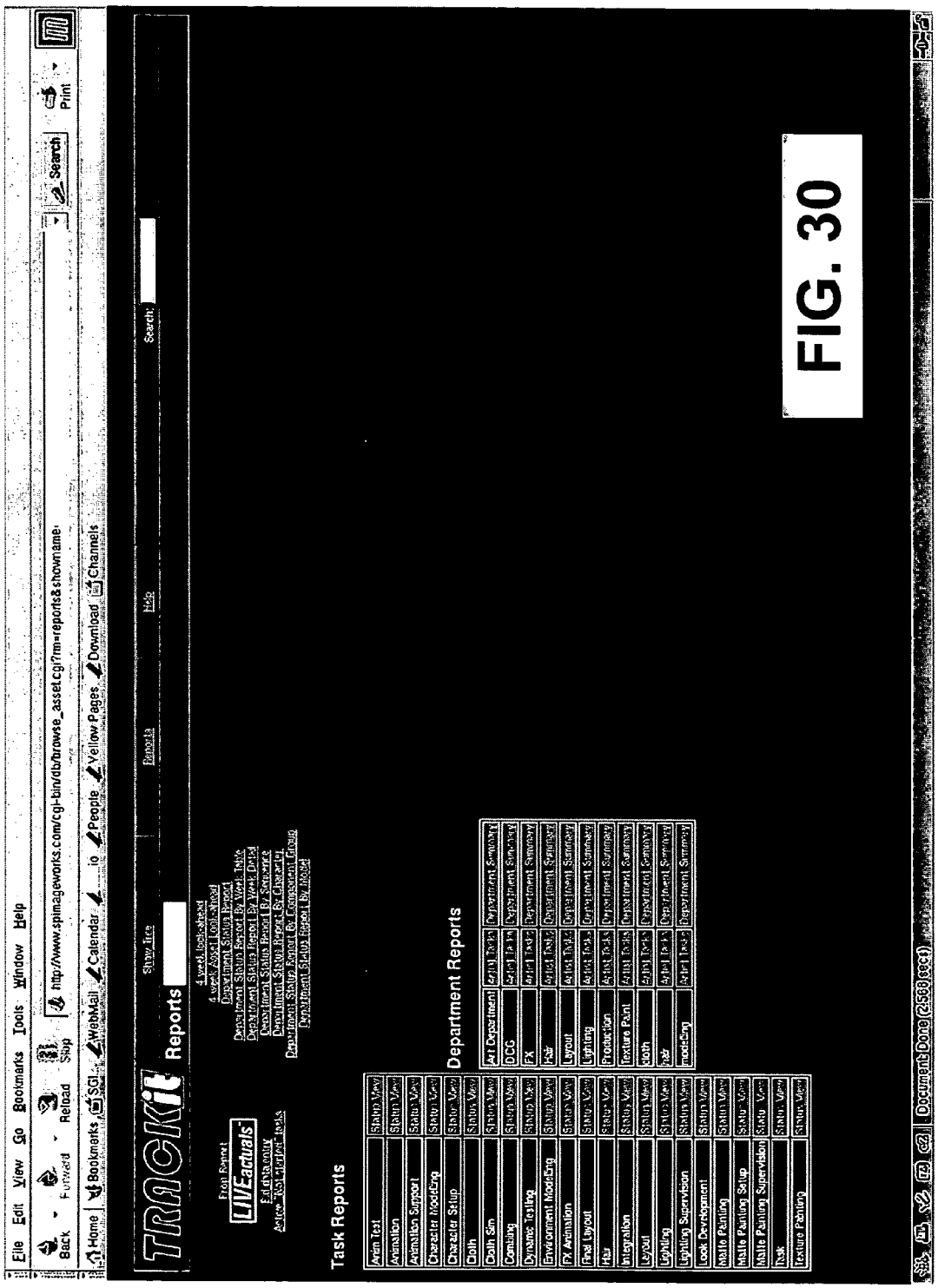
FIG. 30 illustrates one example of a screen shot of a reports home page.

FIG. 30 illustrates one example of a screen shot of a reports home page.

Figure 31:
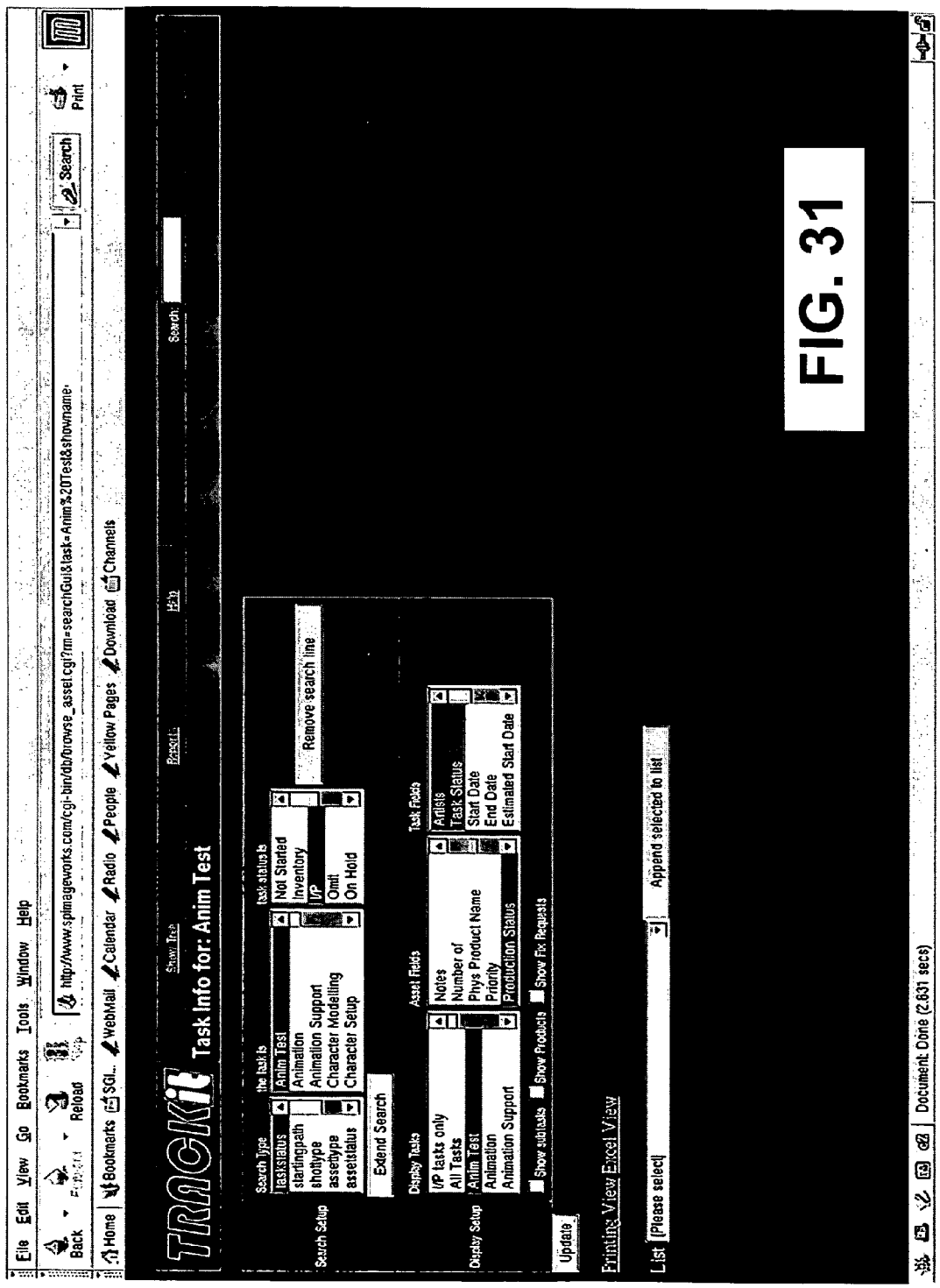
FIG. 31 illustrates one example of a screen shot of a search page.

FIG. 31 illustrates one example of a screen shot of a search page.

FIG. 32 and FIG. 33 illustrate one example of a screen shot of the scheduling interface tool Schedulomatic. As stated above, the tool provides a view into the asset information focused on tracking the status of tasks for assets. In the illustrated example, the tool provides to the user asset information for the selected shot sequences such as: current task, notes on that task, the person assigned to the asset and task, status, estimated start and end dates, estimated total work days to complete (e.g., from a bid), actual start and end days (e.g., input by artists as work progresses), actual total days worked to complete, and actual completion percentage by number.

FIG. 34 through FIG. 38 show more examples of screen shots of shot sequence status reports and look ahead reports.

Several examples of use cases for the asset management system and its interfaces and tools include, but are not limited to the following.

In pre-production where the user is typically a producer or digital production manager, the producer submits data from either a bid template or from a custom graphical user interface. The data should include what assets are in each shot, bidding information for each shot and asset. The system quickly generates for the producer a list of characters, props and environments that need to be modeled, which are then assigned additional details about whether the model needs rigging and whether it's a hero (i.e. should require additional work). The system should enable the producer to go to a shot and add assets (characters, props or environments) to a shot or sequence. Thus, the data can be entered through example screens shown in FIGS. 8-14 and statuses can be retrieved through example screens shown in FIGS. 15-21.

A coordinator in asset generation should be entering task assignments and status information. The coordinator may also need to enter start/end dates or how many actual days have been done for a particular task. See FIGS. 9-10 and 13-14. The coordinator needs to know what assets require some work. The element database (e.g., the TrackIt database 202 in FIG. 2) provides queries, such as the ability to look for assets that are required by active shots where the asset has not been started or completed; and the ability to look for work completed or in-progress in other departments that will be delivering work to do (e.g., the texture painting department might look for models that are partially complete so that they can get a head start on texture painting before the model is published). The coordinator also needs to approve assets for production.

An artist doing asset generation publishes data, which would automatically be reflected in the element database using checking scripts. The artist needs to browse for other assets (possibly find existing textures), and needs to find work to do (as assigned by the coordinator).

An artist in layout needs a good set of search and browse tools to help populate an environment.

A coordinator in animation enters artist assignments, start/end dates, status information and approving animation (under the direction of a animation supervisor). The coordinator may need information about whether all the character rigs are completed so that animation can be started.

An animator needs to know what characters are in the shot and what their status is (e.g., is the rigging completed, or being worked on).

A coordinator in lighting enters artist assignments, start/end dates, status information and approving animation (under the direction of a animation supervisor). The coordinator also needs to know whether all the animation, models and textures are completed on every shot.

A color and lighting artist needs a good overview of what assets are in the shot and what their status is (or who did the work). The artist may also want to know where the key-frame lighting setup for this shot is.

A coordinator in sweatbox or dailies needs to be able to find out the contents of items viewed in dailies, and needs to be able to approve things viewed in dailies and change their status.

A coordinator on rounds or during meetings needs to be able to find out work assigned to an artist. The coordinator also needs to be able to approve work assigned to an artist.

FIG. 8 through FIG. 38 provide examples of tools the artists, coordinators, and animators can use to perform the required task.

The various implementations of the invention are realized in electronic hardware, computer software, or combinations of these technologies. Some implementations include one or more computer programs executed by a programmable processor or computer. For example, referring to FIG. 1, in one implementation, the server includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using assets such as audio, video, computer graphics and supporting data, other implementations can be used for applications such as inventory or project management and scheduling. Similarly, while the productions discussed above are for media, implementations of the management system can be applied to other types of productions as well, such as housing development.

Accordingly, the present invention is not limited to only those implementations described above.

What is claimed is:

1. A computer for managing media assets in media production, comprising:
a database storing a plurality of records, each record storing information for a media asset, said stored information including work performance information for the media asset,
wherein the work performance information includes information which is used to evaluate performance including at least one of amount of time or money actually used, estimated, and bid for the media asset, and also includes information indicating a stage in a pipeline for a corresponding media asset, wherein the pipeline includes an environment modeling pipeline comprising dependencies and relationships among assets of the media production, wherein the environment modeling pipeline includes, in order: (1) modeling, wherein modeling generates component products at the latest when a group of component products is published; (2) texture painting, wherein texture painting comprises a tracking product for each component and a mechanism that determines whether texture painting has been done for a product; and (3) look development, wherein look development defines aspects to create the appearance of a 3-D element;

a database interface coupled to said database and to a network, said database interface providing access to said plurality of records, collecting and managing information for the corresponding media assets, and performing ongoing status check of the media assets and statistical analyses of various production aspects of the media asset including the work performance information for the media asset, wherein said database interface performs tasks including: tracking and managing workflow; adjusting and scheduling of the media assets; and generating reports covering the ongoing status check and the statistical analyses;

one or more data storage components for storing the media assets;

one or more input devices performing input functions for managing the media assets and the tasks performed by said database interface; and one or more output devices performing output functions for managing the media assets and the tasks performed by said database interface.

2. The computer of claim 1, wherein at least one record stores information for the media asset that is a shot for a movie.

3. The computer of claim 2, wherein the stored information includes a name for the shot.

4. The computer of claim 2, wherein the stored information includes a task for the shot.

5. The computer of claim 2, wherein the stored information includes a list of dependent items, which need to be completed prior to the shot.

6. The computer of claim 2, wherein the stored information includes a list of items that is being held up by a lack of progress on the shot.

7. The computer of claim 1, wherein at least one record stores information for a media asset that is music.

8. The computer of claim 1, wherein at least one record stores information for a media asset that is model for computer animation.

9. The computer of claim 1, wherein at least one record stores information for a media asset that includes a list of items that is being held up by a lack of progress on the media asset.

10. The computer of claim 1, wherein said work performance information includes information indicating progress towards completion of a corresponding media asset.

11. The computer of claim 1, wherein said work performance information includes information indicating an entity performing services for a corresponding media asset.

12. The computer of claim 11, wherein said entity includes an art department.

13. The computer of claim 11, wherein said entity includes an artist.

14. A method for managing media assets in media production, comprising:

storing a plurality of records, each record storing information for a media asset, said stored information including work performance information for the media asset, wherein the work performance information includes information which is used to evaluate performance including at least one of amount of time or money actually used, estimated, and bid for the media asset, and also includes information indicating a stage in a pipeline for a corresponding media asset, wherein the pipeline includes an environment modeling pipeline comprising dependencies and relationships among assets of the media production, wherein the environment modeling pipeline includes, in order: (1) modeling, wherein modeling generates component products at the latest when a group of component products is published; (2) texture painting, wherein texture painting comprises a tracking product for each component and a mechanism that determines whether texture painting has been done for a product; and (3) look development, wherein look development defines aspects to create the appearance of a 3-D element;

providing access to said plurality of records;

tracking and managing the stored information for the media assets corresponding to said plurality of records, wherein said tracking and managing includes: tracking and managing workflow; and adjusting and scheduling of the media assets; and performing ongoing status check of the media asset and statistical analyses of various production aspects of the media asset including the work performance information for the media asset, wherein said performing includes generating reports covering the ongoing status check and the statistical analyses.

15. The method of claim 14, wherein said storing includes storing information indicating progress towards completion of a corresponding media asset.

16. The method of claim 14, further comprising updating the stored information for the media asset.

17. The method of claim 14, wherein said tracking and managing the stored information includes receiving real-time status of the information for the media assets in media production.

18. A computer program, stored in a computer-readable storage medium, for managing media assets in media production, the program comprising executable instructions that cause a computer to:

store a plurality of records, each record storing information for a media asset, said each record including work performance information for the media asset, wherein the work performance information includes information which is used to evaluate performance including at least one of amount of time or money actually used, estimated, and bid for the media asset, and also includes information indicating a stage in a pipeline for a corresponding media asset, wherein the pipeline includes an environment modeling pipeline comprising dependencies and relationships among assets of the media production, wherein the environment modeling pipeline includes, in order: (1) modeling, wherein modeling generates component products at the latest when a group of component products is published; (2) texture painting, wherein texture painting comprises a tracking product for each component and a mechanism that determines whether texture painting has been done for a product; and (3) look development, wherein look development defines aspects to create the appearance of a 3-D element;

provide access to said plurality records;

track and manage information for the media assets corresponding to said plurality of records, including executable instructions that cause a computer to: track and manage workflow; and adjust and schedule the media assets; and perform ongoing status check of the media asset and statistical analyses of various production aspects of the media asset, including executable instructions that cause a computer to generate reports covering the ongoing status check and the statistical analyses.

19. The computer program of claim 18, wherein executable instructions that cause a computer to manage media assets in media production further includes executable instructions that cause a computer to store information indicating progress towards completion of a corresponding media asset.

20. An asset management system for managing media assets in media production, comprising:

means for storing a plurality of records, each record storing information for a media asset, said each record including work performance information for the media asset, wherein the work performance information includes information which is used to evaluate performance including at least one of amount of time or money actually used, estimated, and bid for the media asset, and also includes information indicating a stage in a pipeline for a corresponding media asset, wherein the pipeline includes an environment modeling pipeline comprising dependencies and relationships among assets of the media production, wherein the environment modeling pipeline includes, in order: (1) modeling, wherein modeling generates component products at the latest when a group of component products is published; (2) texture painting, wherein texture painting comprises a tracking product for each component and a mechanism that determines whether texture painting has been done for a product; and (3) look development, wherein look development defines aspects to create the appearance of a 3-D element;

means for providing access to said plurality of records;

means for tracking and managing information for the media assets corresponding to said plurality of records, wherein said means for tracking and managing includes: means for tracking and managing workflow; and means for adjusting and scheduling of the media assets; and means for performing ongoing status check of the media asset and statistical analyses of various production aspects of the media asset including the work performance information for the media asset, wherein said means for performing includes means for generating reports covering the ongoing status check and the statistical analyses.

21. The management system of claim 20, wherein the dependencies show that lighting for a shot in a movie depends upon completion of all models for that shot.

* * * * *